United States Patent
Hwang et al.

(10) Patent No.: US 11,419,080 B2
(45) Date of Patent: Aug. 16, 2022

(54) METHOD AND DEVICE FOR TRANSMITTING/RECEIVING S-SSB IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/592,158

(22) Filed: Feb. 3, 2022

(65) Prior Publication Data
US 2022/0159594 A1 May 19, 2022

Related U.S. Application Data

(63) Continuation of application No. PCT/KR2020/009712, filed on Jul. 23, 2020.
(Continued)

(30) Foreign Application Priority Data

Oct. 4, 2019 (KR) .................. 10-2019-0123143
Jun. 2, 2020 (KR) .................. 10-2020-0066633

(51) Int. Cl.
*H04W 56/00* (2009.01)
*H04L 27/26* (2006.01)
*H04W 92/18* (2009.01)

(52) U.S. Cl.
CPC ....... *H04W 56/001* (2013.01); *H04L 27/2607* (2013.01); *H04L 27/26025* (2021.01); *H04W 92/18* (2013.01)

(58) Field of Classification Search
CPC ............ H04W 56/001; H04W 92/18; H04L 27/26025; H04L 27/2607
See application file for complete search history.

(56) References Cited

U.S. PATENT DOCUMENTS

2018/0287840 A1    10/2018  Akkarakaran et al.
2018/0368090 A1*  12/2018  Kadambar ........ H04W 72/1278
(Continued)

OTHER PUBLICATIONS

Huawei & HiSilicon, "Sidelink synchronization mechanisms for NR V2X," R1-1908043, Presented at 3GPP TSG RAN WG1 Meeting #98, Prague, Czech Republic, Aug. 26-30, 2019, 18 pages.
(Continued)

*Primary Examiner* — Kyaw Z Soe
(74) *Attorney, Agent, or Firm* — Fish & Richardson P.C.

(57) ABSTRACT

Provided are a method for a first device carrying out wireless communication, and a device supporting same. The method may comprise the steps of: receiving, from a base station, information on the number of sidelink synchronization signal blocks (S-SSBs) transmitted in an S-SSB period; and, on the basis of the information on the number of S-SSBs, transmitting, in the S-SSB period, one or more S-SSB including a sidelink primary synchronization signal (S-PSS), a sidelink secondary synchronization signal (S-SSS) and a physical sidelink broadcast channel (PSBCH). Here, the number of S-SSBs may be selected from among one or more element included in a set of the number of S-SSBs transmittable in the S-SSB period, wherein the set of the number of S-SSBs transmittable in the S-SSB period may be configured differently on the basis of sub-carrier spacing (SCS) and frequency range (FR).

20 Claims, 28 Drawing Sheets

Related U.S. Application Data

(60) Provisional application No. 62/893,185, filed on Aug. 29, 2019, provisional application No. 62/892,596, filed on Aug. 28, 2019.

(56) References Cited

U.S. PATENT DOCUMENTS

2020/0229114 A1* 7/2020 Ryu ................. H04L 5/0048
2021/0352600 A1* 11/2021 Liu ................. H04L 5/0053

OTHER PUBLICATIONS

ITRI, "Discussion on Sidelink Synchronization Issues and Mechanisms for NR V2X Communication," R1-1908889, Presented at 3GPP TSG RAN WG1 #98, Prague, CZ, Aug. 26-30, 2019, 10 pages.
LG Electronics, "Discussion on NR sidelink synchronization mechanism," R1-1909518, Presented at 3GPP TSG RAN WG1 #98 Meeting, Prague, Aug. 26-30, 2019, 18 pages.
Oppo, "Discussion of synchronization mechanism for NR-V2X," R1-1908363, Presented at 3GPP TSG RAN WG1 #98, Prague, CZ, Aug. 26-30, 2019, 7 pages.

* cited by examiner

FIG. 4
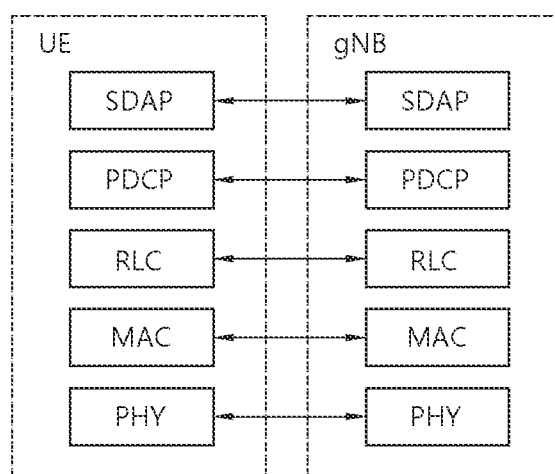
(a)
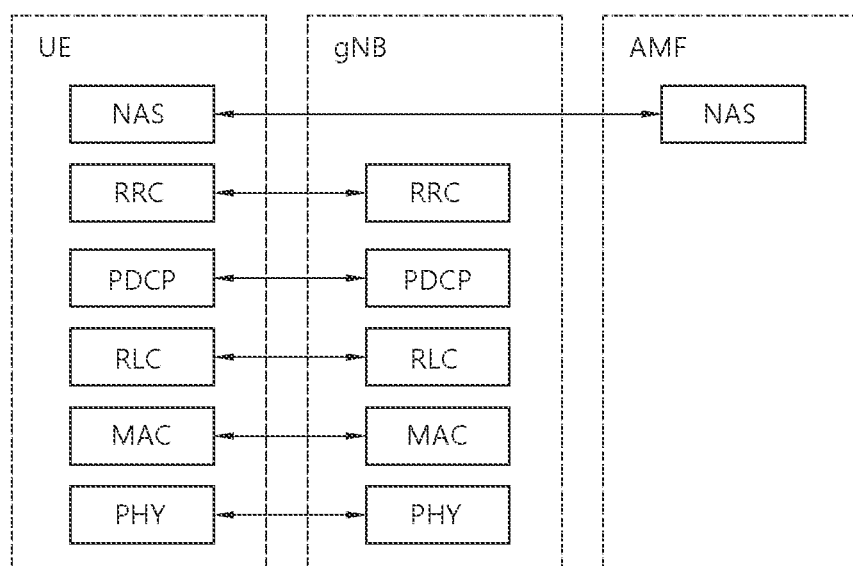
(b)

FIG. 8
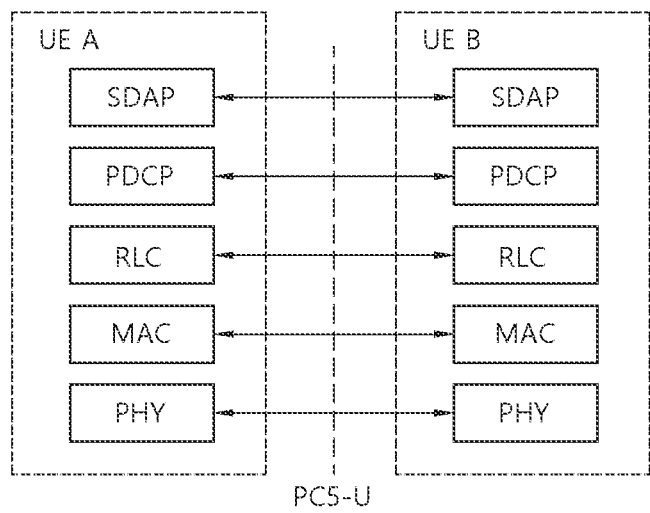
(a)
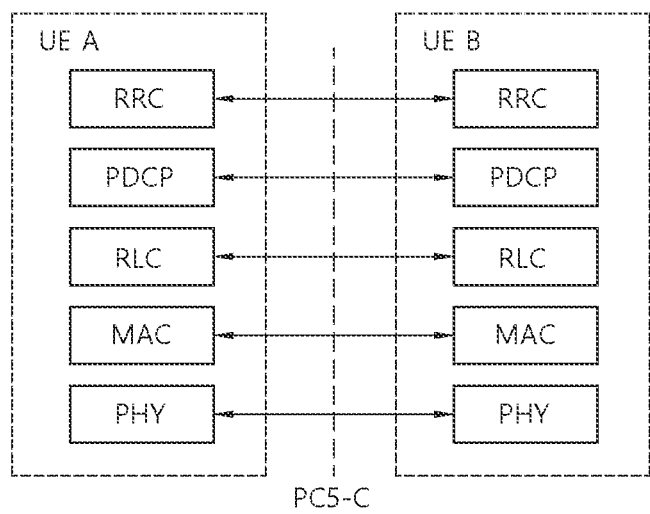
(b)

FIG. 14 perform sidelink communication with first device ～S1410

FIG. 19 transmit S-SSB(s) to second device based on
information related to the number of S-SSBs or
information related to set for
selecting/determining the number of S-SSBs ⎯ S1910

METHOD AND DEVICE FOR TRANSMITTING/RECEIVING S-SSB IN NR V2X

CROSS-REFERENCE TO RELATED APPLICATIONS

Pursuant to 35 U.S.C. § 119(e), this application is a continuation of International Application PCT/KR2020/009712, with an international filing date of Jul. 23, 2020, which claims the benefit of U.S. Provisional Patent Application Nos. 62/892,596, filed on Aug. 28, 2019, and 62/893,185, filed on Aug. 29, 2019, and Korean Patent Application Nos. 10-2019-0123143, filed on Oct. 4, 2019, and 10-2020-0066633, filed on Jun. 2, 2020, the contents of which are hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the NR sidelink system, a plurality of numerologies with different subcarrier spacing (SCS) and/or CP lengths may be supported. In this case, as the size of the SCS increases, the length of a time resource for the transmitting UE to transmit the S-SSB may be shortened. Due to this, the coverage of the S-SSB may be reduced. Therefore, in order to ensure the coverage of the S-SSB, the number of S-SSBs transmitted by the transmitting UE to the receiving UE within a specific S-SSB transmission period (e.g., 160 ms) may be configured or pre-configured to one or more for the transmitting UE, based on the size of the SCS. Additionally, in order to ensure the coverage of the S-SSB, the number of S-SSBs transmitted by the transmitting UE to the receiving UE within one S-SSB transmission period or a set for selecting/determining the number of S-SSBs transmitted by the transmitting UE to the receiving UE within one S-SSB transmission period needs to be configured.

Technical Solutions

In one embodiment, a method for performing, by a first device, wireless communication is provided. The method may comprise: receiving, from a base station, information related to a number of sidelink synchronization signal blocks (S-SSBs) transmitted within a S-SSB period; and transmitting one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station, information related to a number of sidelink synchronization signal blocks (S-SSBs) transmitted within a S-SSB period; and transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 14 shows a method for a second device to perform sidelink communication with a first device, based on an embodiment of the present disclosure.

FIG. 19 shows a method for a first device to transmit an S-SSB, based on an embodiment of the present disclosure.

DESCRIPTION OF EXEMPLARY EMBODIMENTS

Figure 1:
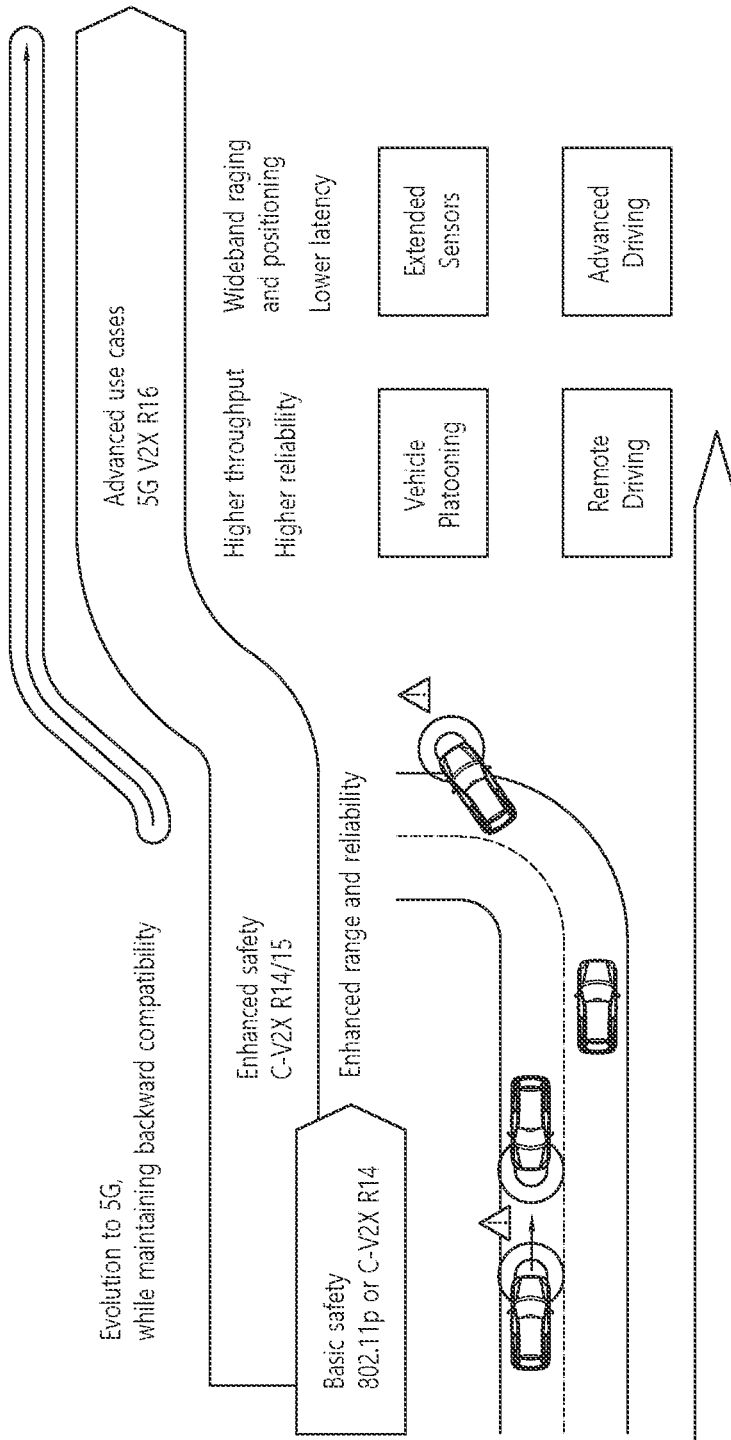
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet radio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
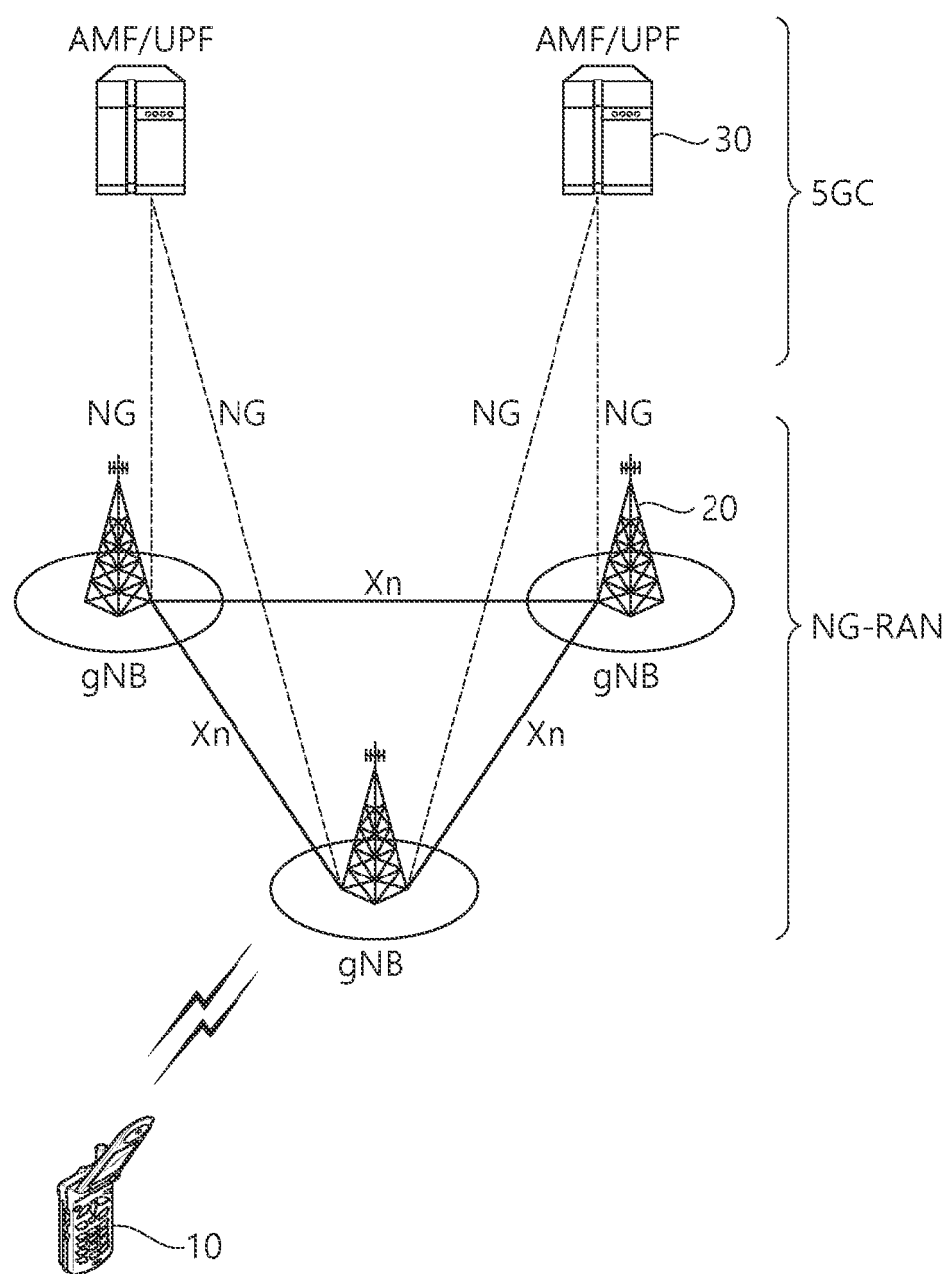
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
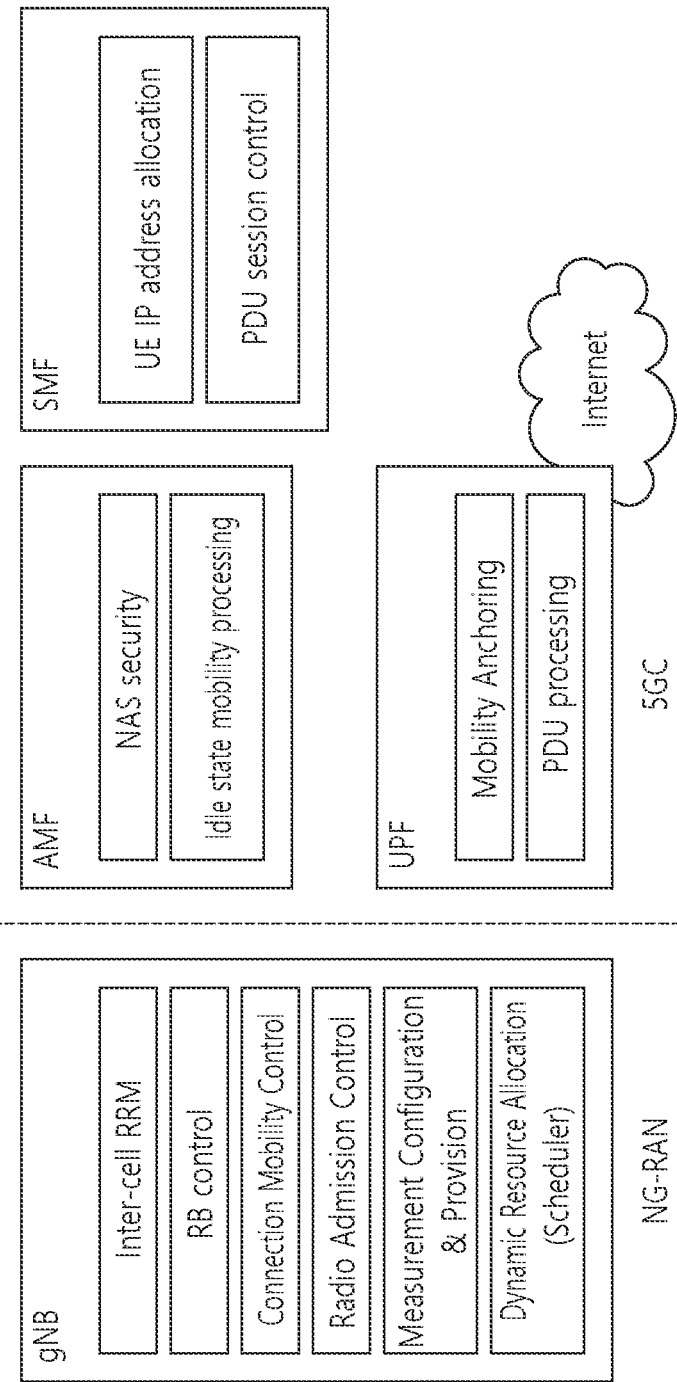
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
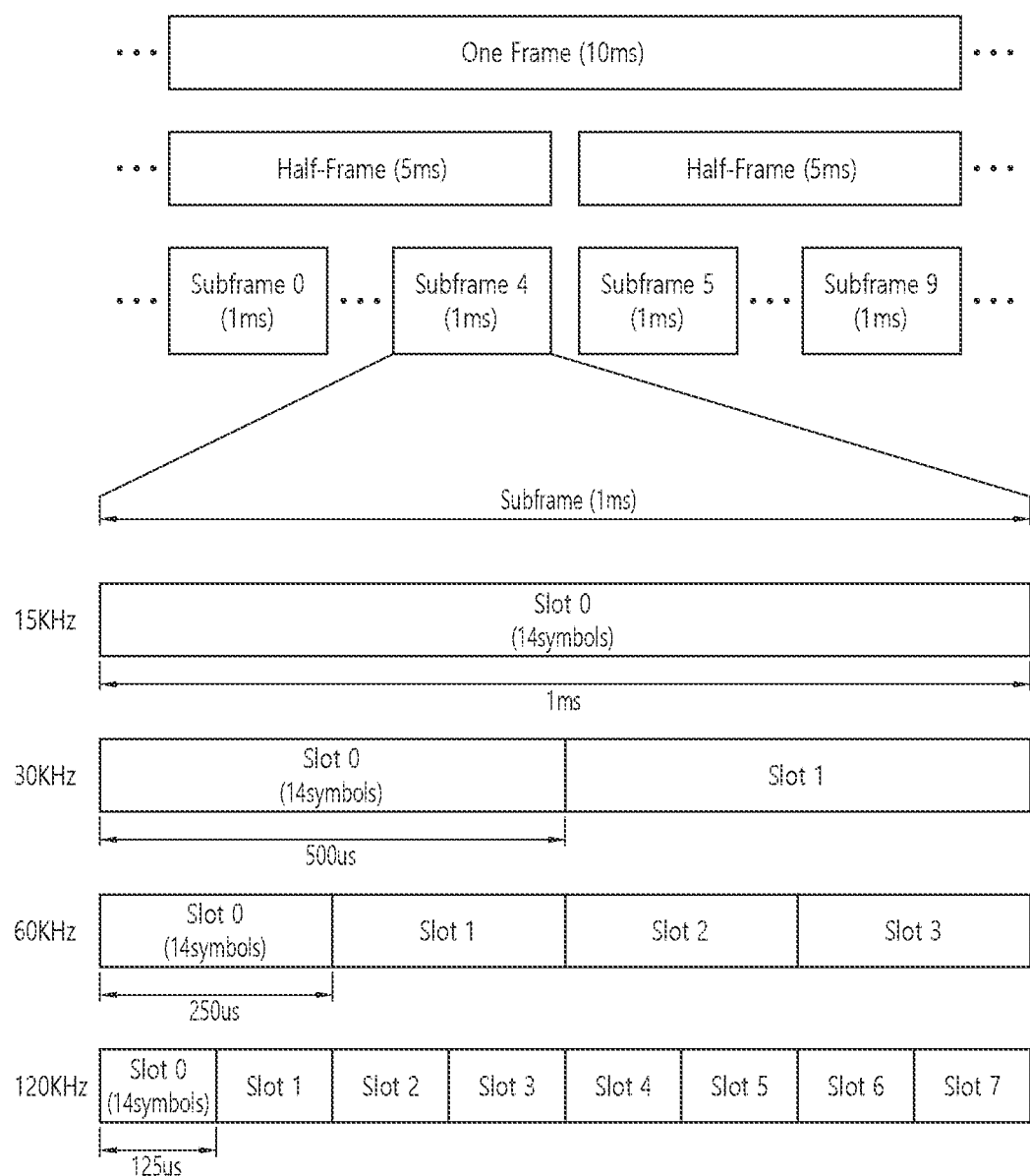
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^U$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^U$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
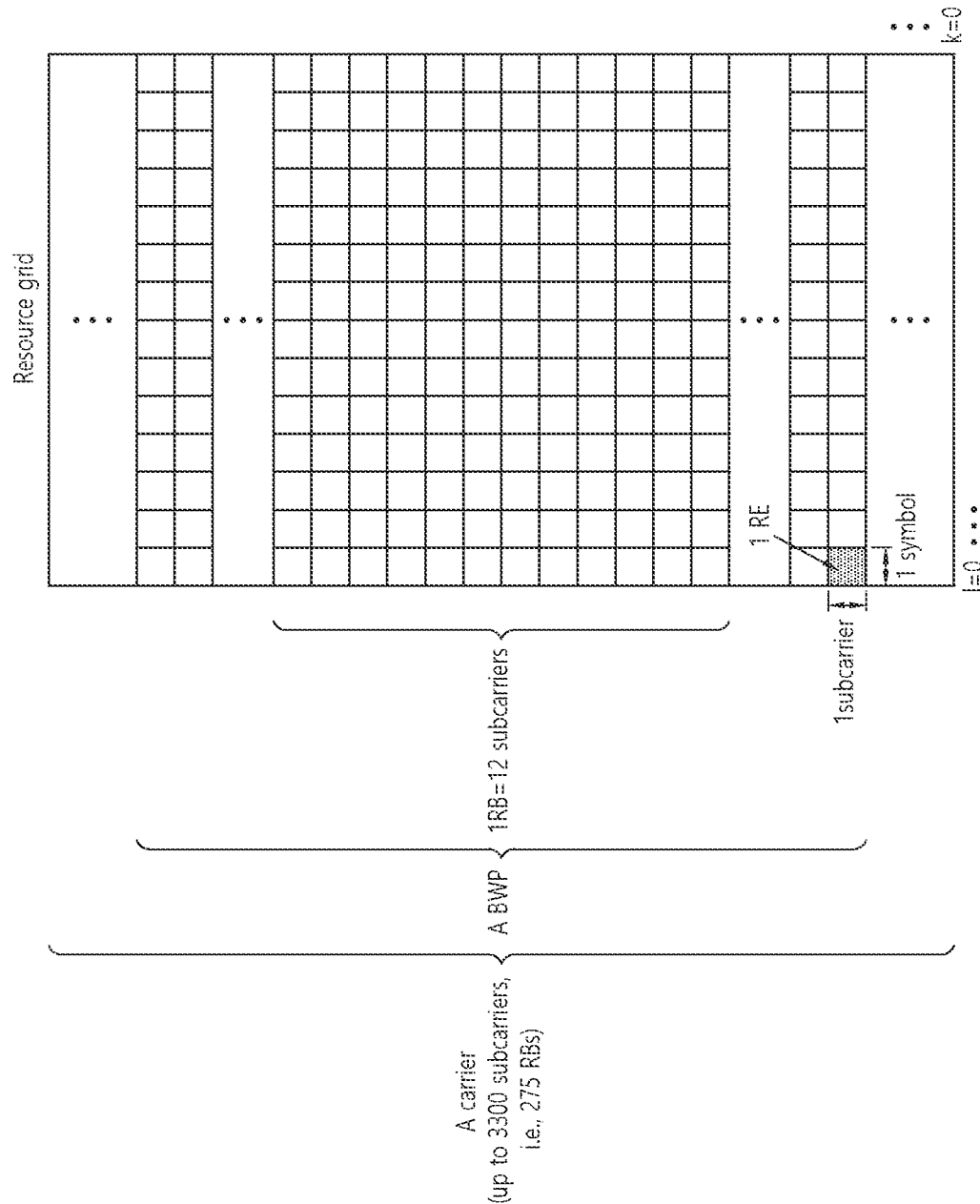
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit n SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
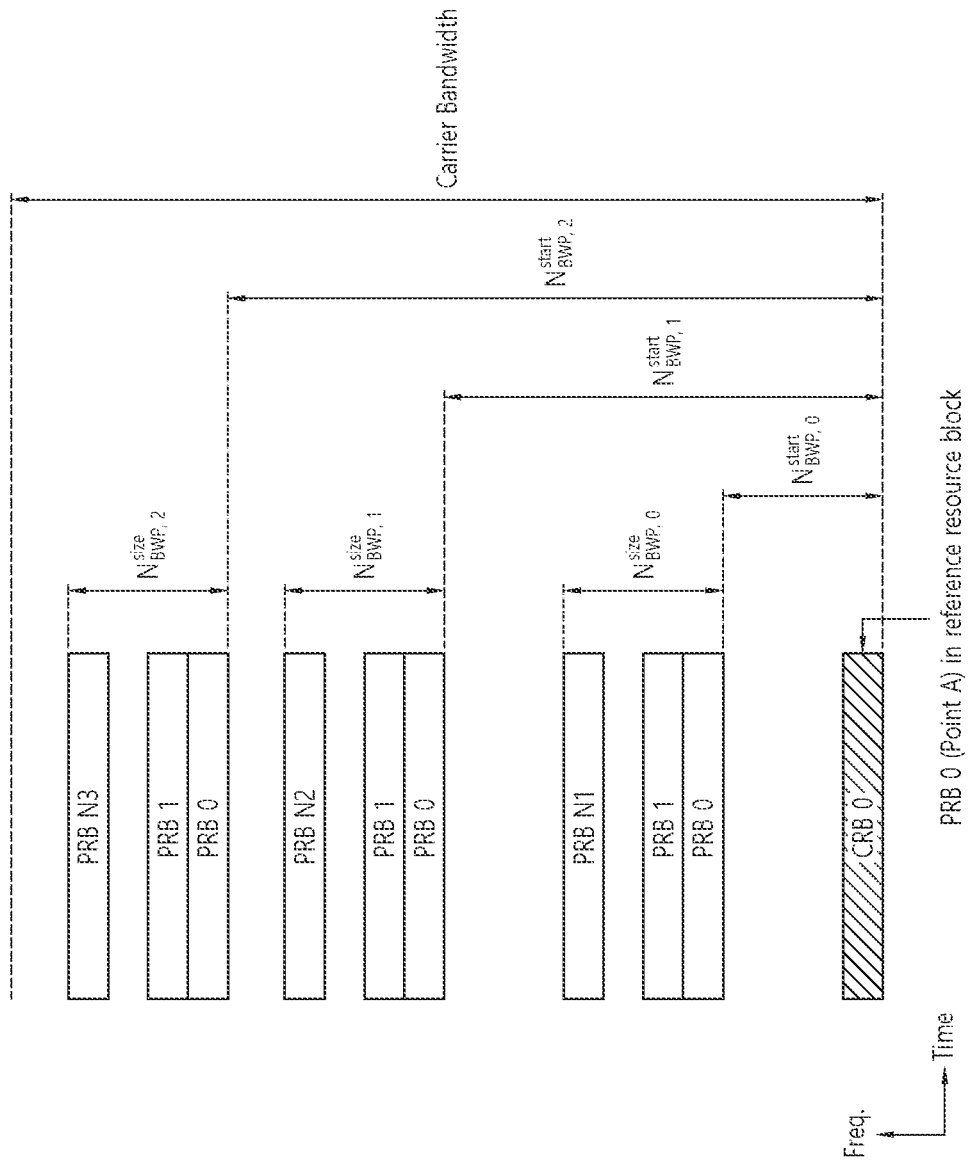
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
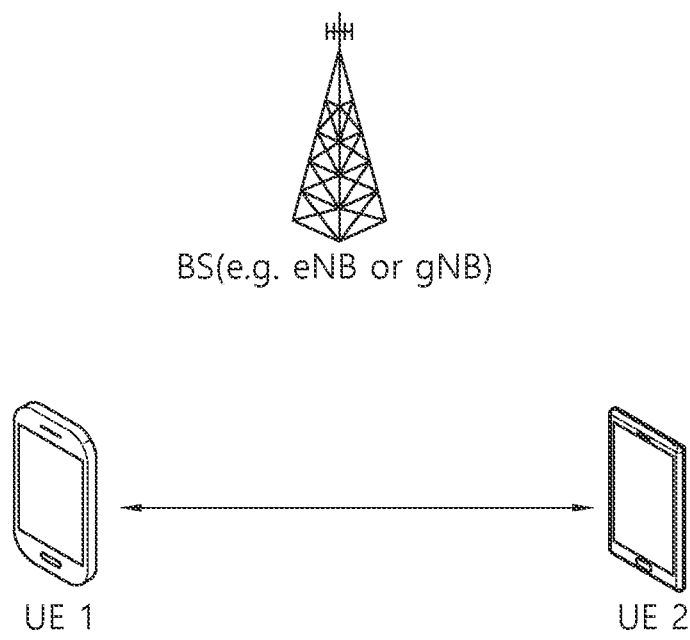
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
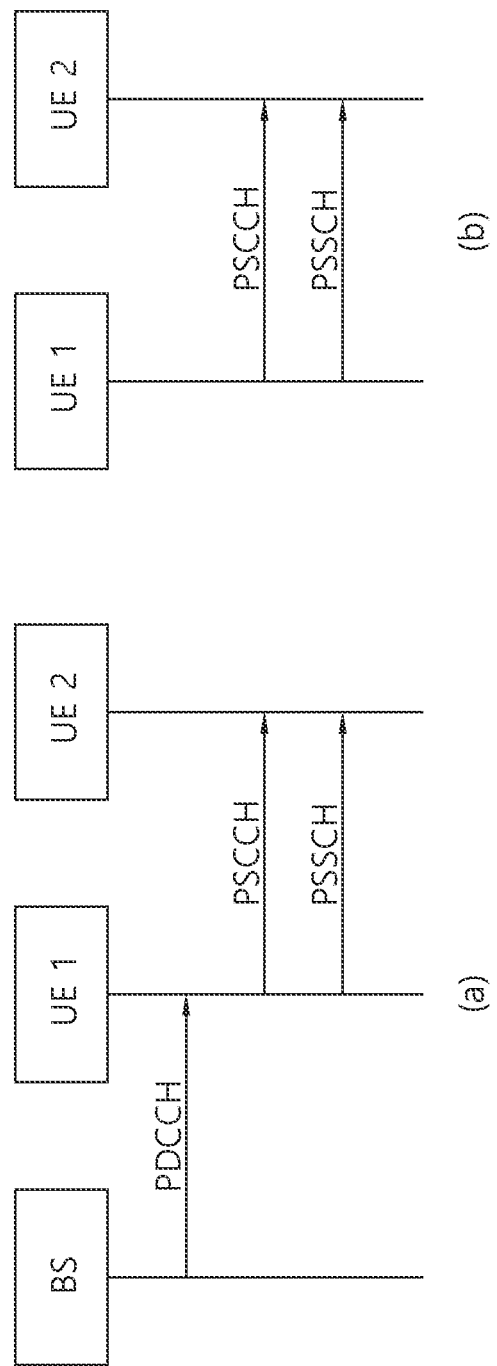
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
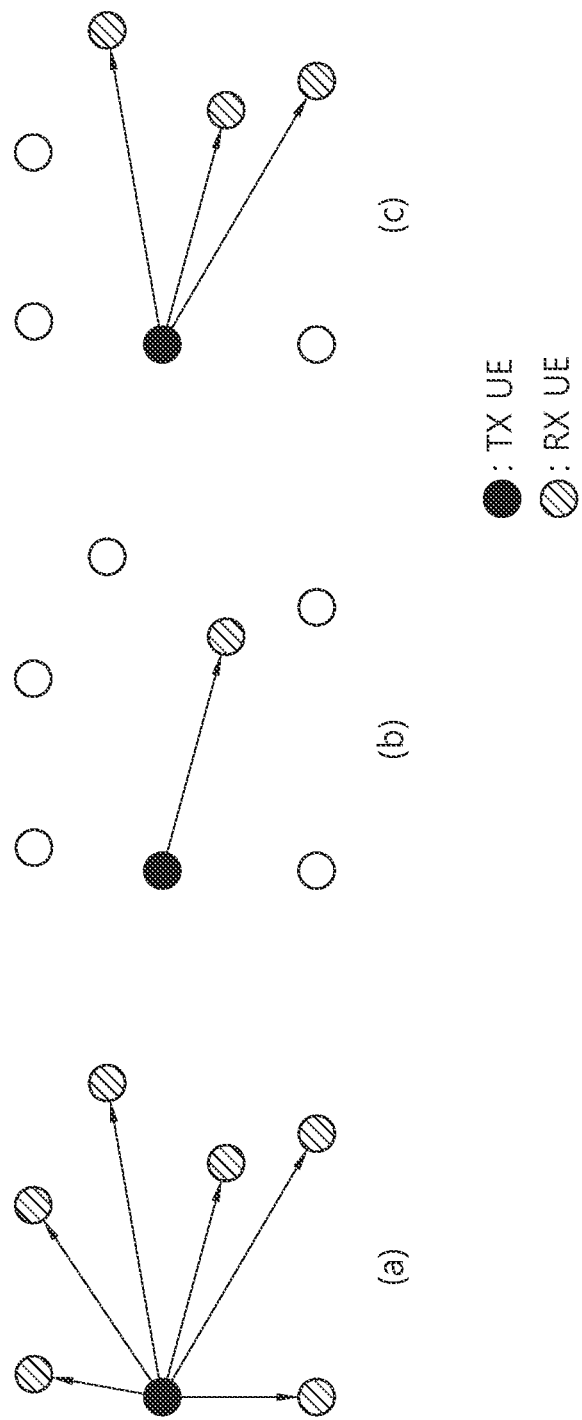
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, synchronization acquisition of a SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 12:
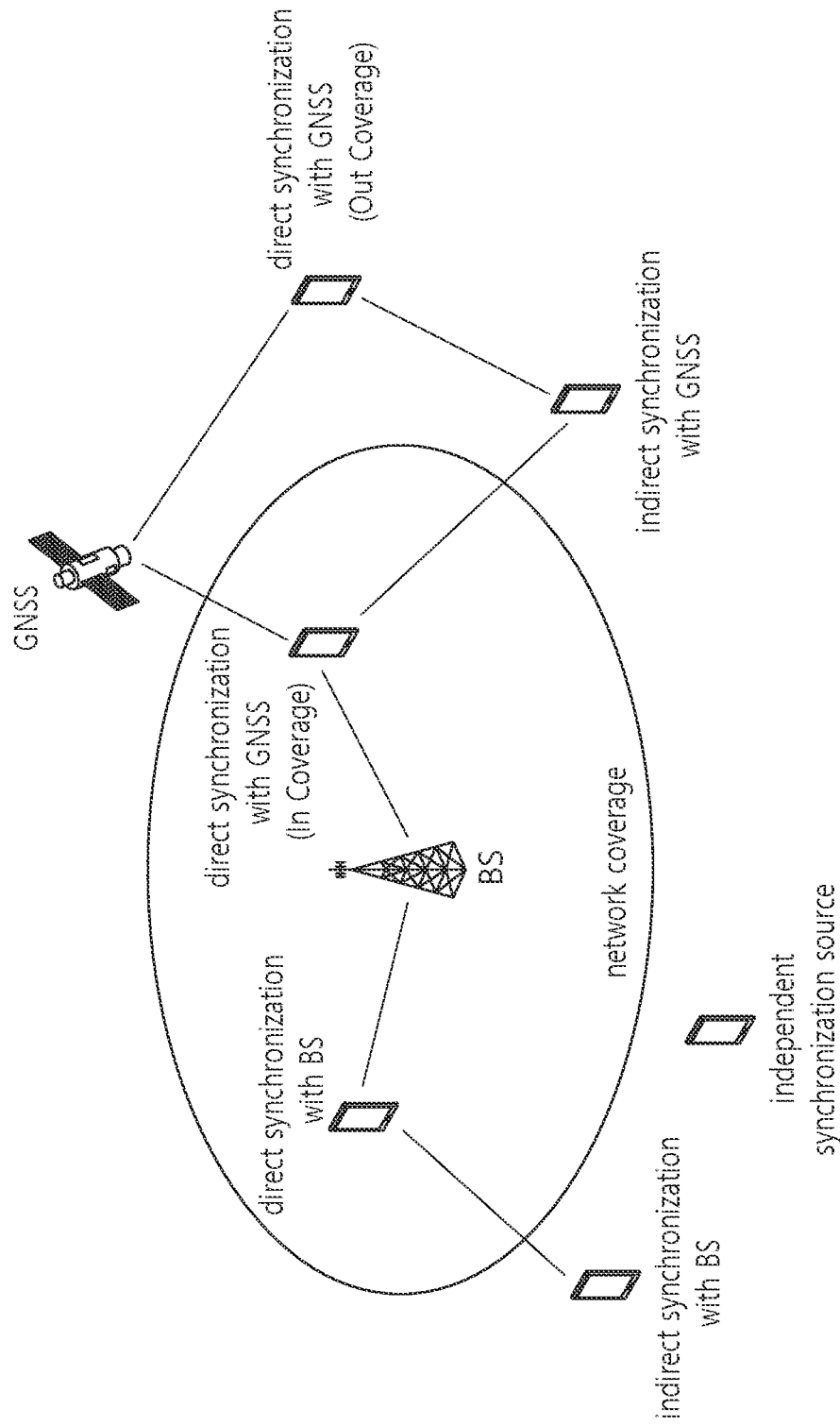
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |

TABLE 5-continued

| Priority level | GNSS-based synchronization | eNB/gNB-based synchronization |
|---|---|---|
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, in the next generation sidelink system, the size of a frequency axis of a resource pool may be configured or pre-configured. For example, the size of the frequency axis of the resource pool may be the number of resource blocks (RBs) or the number of subchannels.

Meanwhile, depending on the size of the frequency axis of the resource pool, a time required for automatic gain control (AGC) tuning of a receiving UE may be different. For example, in the case of a random sequence based on Quadrature Phase Shift Keying (QPSK) Cyclic Prefix (CP)-Orthogonal Frequency Division Multiplexing (OFDM), in order for a time required for AGC tuning of a receiving UE to be set within one symbol duration, a transmitting UE may have to perform sidelink transmission through at least 10 PRBs. On the other hand, if a transmitting UE performs sidelink transmission through PRBs less than 10 PRBs, a time required for AGC tuning of a receiving UE may be greater than one symbol duration.

Meanwhile, a time required for AGC tuning of a UE may be different depending on characteristics of a signal and/or a channel. For example, if a sequence related to low PAPR is used for sidelink transmission and/or if comb-type mapping is used for sidelink transmission, a time required for AGC tuning of a receiving UE may be within one symbol duration even if a transmitting UE performs sidelink transmission through less PRB (e.g., less than 10 PRBs). In various embodiments of the present disclosure, comb-type mapping may refer to a method in which sequences are mapped only to subcarriers with odd indexes or sequences are mapped only to subcarriers with even indexes.

Based on an embodiment of the present disclosure, a mapping method and/or a type of a sequence mapped to the first symbol may be different, based on at least one of the size of the frequency axis of the resource pool, the size of a subchannel, the number of allocated subchannels, a modulation scheme, and/or the number of code blocks.

For example, if the size of the frequency axis of the resource pool is less than or equal to N, AGC-RS(s) may be mapped to the first symbol. For example, if the size of the frequency axis of the resource pool is less than or equal to N, the transmitting UE may map AGC-RS(s) to the first symbol and transmit it to the receiving UE. For example, if the size of the frequency axis of the resource pool is less than or equal to N, a PSSCH or a PSCCH may be mapped to the first symbol based on the comb-type. For example, if the size of the frequency axis of the resource pool is less than or equal to N, the transmitting UE may map the PSSCH or the PSCCH to the first symbol as the comb-type, and transmit it to the receiving UE.

Additionally/alternatively, for example, if the size of the subchannel of the resource pool is less than or equal to N, AGC-RS(s) may be mapped to the first symbol. For example, if the size of the subchannel of the resource pool is less than or equal to N, the transmitting UE may map AGC-RS(s) to the first symbol and transmit it to the receiving UE. For example, if the size of the subchannel of the resource pool is less than or equal to N, a PSSCH or a PSCCH may be mapped to the first symbol based on the comb-type. For example, if the size of the subchannel of the resource pool is less than or equal to N, the transmitting UE may map the PSSCH or the PSCCH to the first symbol as the comb-type, and transmit it to the receiving UE.

Additionally/alternatively, for example, if the number of allocated subchannels is less than or equal to N, AGC-RS(s) may be mapped to the first symbol. For example, if the number of allocated subchannels is less than or equal to N, the transmitting UE may map AGC-RS(s) to the first symbol and transmit it to the receiving UE. For example, if the number of allocated subchannels is less than or equal to N, a PSSCH or a PSCCH may be mapped to the first symbol based on the comb-type. For example, if the number of allocated subchannels is less than or equal to N, the transmitting UE may map the PSSCH or the PSCCH to the first symbol as the comb-type, and transmit it to the receiving UE.

Additionally/alternatively, for example, if the modulation scheme is higher than the order of QPSK, AGC-RS(s) may be mapped to the first symbol. For example, if the modulation scheme is higher than the order of QPSK, the transmitting UE may map AGC-RS(s) to the first symbol and transmit it to the receiving UE. For example, if the modulation scheme is higher than the order of QPSK, a PSSCH or a PSCCH may be mapped to the first symbol based on the comb-type. For example, if the modulation scheme is higher than the order of QPSK, the transmitting UE may map the PSSCH or the PSCCH to the first symbol as the comb-type, and transmit it to the receiving UE. For example, in the case of 16QAM, 64QAM, or 256QAM, the modulation scheme may be higher than the order of QPSK.

Additionally/alternatively, for example, if the number of code blocks is greater than or equal to M, AGC-RS(s) may be mapped to the first symbol. For example, if the number of code blocks to be transmitted by the transmitting UE is greater than or equal to M, the transmitting UE may map AGC-RS(s) to the first symbol and transmit it to the receiving UE. For example, if the number of code blocks is greater than or equal to M, a PSSCH or a PSCCH may be mapped to the first symbol based on the comb-type. For example, if the number of code blocks to be transmitted by the transmitting UE is greater than or equal to M, the transmitting UE may map the PSSCH or the PSCCH to the first symbol as the comb-type, and transmit it to the receiving UE.

For example, a base station and/or a network may configure or pre-configure the N value for the UE. For example, the N value may be pre-defined for the UE.

For example, the base station and/or the network may configure or pre-configure the M value for the UE. For example, the M value may be pre-defined for the UE.

For example, if the size of the frequency axis of the resource pool is greater than or equal to N, a PSSCH may be mapped to all allocated resource elements (REs). For example, if the size of the frequency axis of the resource pool is greater than or equal to N, the transmitting UE may map the PSSCH to all allocated resource elements (REs), and may transmit it to the receiving UE.

Additionally/alternatively, for example, if the size of the subchannel of the resource pool is greater than or equal to N, a PSSCH may be mapped to all allocated resource elements (REs). For example, if the size of the subchannel of the resource pool is greater than or equal to N, the transmitting UE may map the PSSCH to all allocated resource elements (REs), and may transmit it to the receiving UE.

Additionally/alternatively, for example, if the number of allocated subchannels is greater than or equal to N, a PSSCH may be mapped to all allocated resource elements (REs). For example, if the number of allocated subchannels is greater than or equal to N, the transmitting UE may map the PSSCH to all allocated resource elements (REs), and may transmit it to the receiving UE.

Additionally/alternatively, for example, if the modulation scheme is QPSK, a PSSCH may be mapped to all allocated resource elements (REs). For example, if the modulation scheme is QPSK, the transmitting UE may map the PSSCH to all allocated resource elements (REs), and may transmit it to the receiving UE.

Additionally/alternatively, for example, if the number of code blocks is less than or equal to M, a PSSCH may be mapped to all allocated resource elements (REs). For example, if the number of code blocks to be transmitted by the transmitting UE is less than or equal to M, the transmitting UE may map the PSSCH to all allocated resource elements (REs), and may transmit it to the receiving UE.

Meanwhile, the AGC-RS may need to be designed to efficiently reduce the time required for AGC tuning. For example, the AGC-RS may be selected as a sequence related to low PAPR. For example, the length of the sequence of the AGC-RS may vary according to the number of PRBs allocated for a PSSCH.

For example, the AGC-RS may use a sequence of a DMRS and/or a CSI-RS of a PSSCH, or may be in the form of a copy of a part of the DMRS and/or a part of the CSI-RS. For example, data of a PSSCH may be mapped as the AGC-RS, and the modulation scheme may be changed to QPSK. For example, the transmitting UE may transmit data through the PSSCH in the first symbol by using the QPSK modulation scheme, and the receiving UE may perform an AGC operation by using the data transmitted in the first symbol. For example, the AGC-RS may be in the form of a copy of some symbols of a PSCCH and/or a PSSCH.

Based on an embodiment of the present disclosure, a starting symbol of a PSCCH, a first DMRS position, and/or a TBS setting method may be different, based on at least one of the size of the frequency axis of the resource pool, the size of the subchannel, the number of allocated subchannels, and/or the modulation scheme. This is to make different mapping and the TBS setting in consideration of the different time required for AGC tuning.

For example, if the size of the frequency axis of the resource pool is less than or equal to N, the transmitting UE may not map a PSCCH and a DMRS to the first symbol and the second symbol of SL resources. For example, the starting symbol of the PSCCH may be the third symbol or the fourth symbol of SL resources. Additionally/alternatively, for example, the transmitting UE may map the first DMRS to the third symbol. For example, the transmitting UE may map DMRS(s) only to subchannel(s) to which the PSCCH is not mapped.

Additionally/alternatively, for example, if the transmitting UE calculates a transport block size (TBS), the first symbol and the second symbol may be excluded from the TBS calculation. Additionally, for example, a symbol for TX-RX switching may be excluded from the TBS calculation.

Additionally/alternatively, for example, if the size of the subchannel of the resource pool is less than or equal to N, the transmitting UE may not map a PSCCH and a DMRS to the first symbol and the second symbol of SL resources. For example, the starting symbol of the PSCCH may be the third symbol or the fourth symbol of SL resources.

Additionally/alternatively, for example, the transmitting UE may map the first DMRS to the third symbol. For example, the transmitting UE may map DMRS(s) only to subchannel(s) to which the PSCCH is not mapped. Additionally/alternatively, for example, if the transmitting UE calculates a transport block size (TBS), the first symbol and the second symbol may be excluded from the TBS calculation. Additionally, for example, a symbol for TX-RX switching may be excluded from the TBS calculation.

Additionally/alternatively, for example, if the number of allocated subchannels is less than or equal to N, the transmitting UE may not map a PSCCH and a DMRS to the first symbol and the second symbol of SL resources. For example, the starting symbol of the PSCCH may be the third symbol or the fourth symbol of SL resources. Additionally/alternatively, for example, the transmitting UE may map the first DMRS to the third symbol. For example, the transmitting UE may map DMRS(s) only to subchannel(s) to which the PSCCH is not mapped. Additionally/alternatively, for example, if the transmitting UE calculates a transport block size (TBS), the first symbol and the second symbol may be excluded from the TBS calculation. Additionally, for example, a symbol for TX-RX switching may be excluded from the TBS calculation.

Additionally/alternatively, for example, if the modulation scheme is higher than the order of QPSK, the transmitting UE may not map a PSCCH and a DMRS to the first symbol and the second symbol of SL resources. For example, the starting symbol of the PSCCH may be the third symbol or the fourth symbol of SL resources. Additionally/alternatively, for example, the transmitting UE may map the first DMRS to the third symbol. For example, the transmitting UE may map DMRS(s) only to subchannel(s) to which the PSCCH is not mapped. Additionally/alternatively, for example, if the transmitting UE calculates a transport block size (TBS), the first symbol and the second symbol may be excluded from the TBS calculation. Additionally, for example, a symbol for TX-RX switching may be excluded from the TBS calculation.

For example, if the size of the frequency axis of the resource pool is greater than or equal to N, the transmitting UE may not map a PSCCH and a DMRS to the first symbol of SL resources. For example, the starting symbol of the PSCCH may be the second symbol or the third symbol of SL resources. Additionally/alternatively, for example, the transmitting UE may map the first DMRS to the second symbol.

For example, the transmitting UE may map DMRS(s) only to subchannel(s) to which the PSCCH is not mapped. Additionally/alternatively, for example, if the transmitting UE calculates a transport block size (TBS), the first symbol may be excluded from the TBS calculation. Additionally, for example, a symbol for TX-RX switching may be excluded from the TBS calculation.

Additionally/alternatively, for example, if the size of the subchannel of the resource pool is greater than or equal to N, the transmitting UE may not map a PSCCH and a DMRS to the first symbol of SL resources. For example, the starting symbol of the PSCCH may be the second symbol or the third symbol of SL resources. Additionally/alternatively, for example, the transmitting UE may map the first DMRS to the second symbol. For example, the transmitting UE may map DMRS(s) only to subchannel(s) to which the PSCCH is not mapped. Additionally/alternatively, for example, if the transmitting UE calculates a transport block size (TBS), the first symbol may be excluded from the TBS calculation. Additionally, for example, a symbol for TX-RX switching may be excluded from the TBS calculation.

Additionally/alternatively, for example, if the number of allocated subchannels is greater than or equal to N, the transmitting UE may not map a PSCCH and a DMRS to the first symbol of SL resources. For example, the starting symbol of the PSCCH may be the second symbol or the third symbol of SL resources. Additionally/alternatively, for example, the transmitting UE may map the first DMRS to the second symbol. For example, the transmitting UE may map DMRS(s) only to subchannel(s) to which the PSCCH is not mapped.

Additionally/alternatively, for example, if the transmitting UE calculates a transport block size (TBS), the first symbol may be excluded from the TBS calculation. Additionally, for example, a symbol for TX-RX switching may be excluded from the TBS calculation.

Additionally/alternatively, for example, if the modulation scheme is QPSK, the transmitting UE may not map a PSCCH and a DMRS to the first symbol of SL resources. For example, the starting symbol of the PSCCH may be the second symbol or the third symbol of SL resources. Additionally/alternatively, for example, the transmitting UE may map the first DMRS to the second symbol. For example, the transmitting UE may map DMRS(s) only to subchannel(s) to which the PSCCH is not mapped. Additionally/alternatively, for example, if the transmitting UE calculates a transport block size (TBS), the first symbol may be excluded from the TBS calculation. Additionally, for example, a symbol for TX-RX switching may be excluded from the TBS calculation.

Meanwhile, if the location of a PSCCH is related to scheduling information of a PSSCH, the receiving UE may need to perform additional blind decoding (BD) to receive the PSCCH. For example, if the number of AGC symbols is changed according to a modulation scheme or the number of resource blocks of the PSSCH, and the location of the PSCCH is related to scheduling information of the PSSCH, there may be a problem that the receiving UE needs to know the modulation scheme or the number of resource blocks of the PSSCH in order for the receiving UE to decode the PSCCH. To this end, the receiving UE may need to perform additional BD.

Accordingly, the transmitting UE may perform PSCCH mapping assuming scheduling information of a specific PSSCH. For example, the transmitting UE may map the PSCCH assuming that the size of the frequency axis of the resource pool is less than or equal to N, and the transmitting UE may transmit the PSCCH to the receiving UE. Additionally/alternatively, for example, the transmitting UE may map the PSCCH assuming that the size of the subchannel of the resource pool is less than or equal to N, and the transmitting UE may transmit the PSCCH to the receiving UE. Additionally/alternatively, for example, the transmitting UE may map the PSCCH assuming that the number of allocated subchannels is less than or equal to N, and the transmitting UE may transmit the PSCCH to the receiving UE. Additionally/alternatively, for example, the transmitting UE may map the PSCCH assuming that the modulation scheme is higher than the order of QPSK, and the transmitting UE may transmit the PSCCH to the receiving UE. For example, regardless of the size of the frequency axis of the resource pool, the size of the subchannel of the resource pool, the number of allocated subchannels, and/or the modulation scheme, the transmitting UE may map the PSCCH. For example, the transmitting UE may map the PSCCH assuming that the AGC duration is 2 symbols, and the transmitting UE may transmit the PSCCH to the receiving UE. For example, although the actual AGC duration is 1 symbol, the transmitting UE may map the PSCCH assuming that the AGC duration is 2 symbols, and the transmitting UE may transmit the PSCCH to the receiving UE.

Meanwhile, the number of antenna ports or the number of layers for PSSCH transmission may be one or plural (e.g., two). For example, the number of antenna ports or the number of layers for PSSCH transmission may be the number of antenna ports or the number of layers used by the UE for PSSCH transmission. For example, the number of antenna ports or the number of layers for PSSCH transmission may be the maximum number of antenna ports or the maximum number of layers available for PSSCH transmission by the UE. In this case, the number of antenna ports used by the UE for CSI-RS transmission may be limited based on the number of antenna ports or the number of layers for PSSCH transmission. For example, a type of CSI report or a type of information included in the CSI report may be limited based on the number of antenna ports or the number of layers for PSSCH transmission.

For example, if the number of antenna ports or the number of layers for PSSCH transmission is 1, RI may be excluded from the CSI report transmitted by the UE.

For example, if the number of antenna ports or the number of layers for PSSCH transmission is 1, only a method assuming 1-layer transmission or 1-antenna port transmission for CQI may be supported. For example, if the number of antenna ports or the number of layers for PSSCH transmission is 1, the UE which has received CSI-RS(s) through the PSSCH may measure and/or report CQI after assuming one layer-based transmission or one antenna port-based transmission.

For example, if the number of antenna ports or the number of layers for PSSCH transmission is 2, a method assuming 1-layer transmission or 1-antenna port transmission for CQI and/or a method assuming 2-layer transmission or 2-antenna port transmission for CQI may be supported. For example, if the number of antenna ports or the number of layers for PSSCH transmission is 2, the UE which has received CSI-RS(s) through the PSSCH may measure and/or report CQI after assuming one or two layer-based transmission or one or two antenna port-based transmission. Herein, for example, the UE receiving the CSI-RS(s) may receive information related to the number of antenna ports or information related to the number of layers used/assumed for CQI measurement from a UE transmitting the CSI-RS(s). For example, information related to the number of antenna ports or information related to the number of layers used/assumed for CQI measurement may be received through PC5-RRC signaling. For example, the UE receiving the CSI-RS(s) may receive information related to the number of antenna ports or information related to the number of layers used/assumed for CQI measurement from a base station. For example, the base station may configure or pre-configure information related to the number of antenna ports or information related to the number of layers used/assumed for CQI measurement to the UE through RRC signaling.

For example, the number of antenna ports for CSI-RS transmission may not be configured to be greater than the number of antenna ports or the number of layers for PSSCH transmission.

Meanwhile, the number of antenna ports for CSI-RS transmission may be different from the number of antenna ports for PSSCH transmission. For example, the number of antenna ports for CSI-RS transmission may be the number of antenna ports used by the UE for CSI-RS transmission. For example, the number of antenna ports for CSI-RS transmission may be the maximum number of antenna ports available for CSI-RS transmission by the UE.

For example, the number of antenna ports for CSI-RS transmission may be one, and the number of antenna ports for PSSCH transmission may be two. In this case, CSI-RS(s) having the same sequence value may be repeatedly mapped to a plurality of layers for PSSCH transmission. For example, the UE may repeatedly map CSI-RS(s) having the same sequence value to a first layer and a second layer for PSSCH transmission and transmit it. In the above situation, in the first layer, Energy Per Resource Element (EPRE) for a CSI-RS is the same as EPRE for an RE on the PSSCH (e.g., an RE to which CSI-RS(s) is not mapped or an RE to which data is mapped). In addition, in the second layer, EPRE for a CSI-RS may be zero. For example, the UE may map CSI-RS(s) to one or more REs on the first layer, and the UE may map CSI-RS(s) corresponding to 'EPRE=0' to one or more REs on the second layer corresponding to the one or more REs on the first layer. In this case, on the layer to which no CSI-RS is mapped (i.e., the layer to which the CSI-RS with zero EPRE is mapped), the UE may perform power control for the PSSCH by boosting Power Spectral Density (PSD) for the PSSCH by the number of CSI-RS related REs. For example, in order to equalize PSSCH power in each layer, EPRE for a PSSCH of a layer in which a CSI-RS is not included may be higher than EPRE for a PSSCH of a layer in which a CSI-RS is included. For convenience of explanation, in the above-described embodiment, it is assumed that the number of antenna ports for CSI-RS transmission is one and the number of antenna ports for PSSCH transmission is two, but the technical idea of the present disclosure is not limited thereto. The technical idea of the present disclosure may be extended in case the number of antenna ports for PSSCH transmission is greater than the number of antenna ports for CSI-RS transmission.

Figure 13:
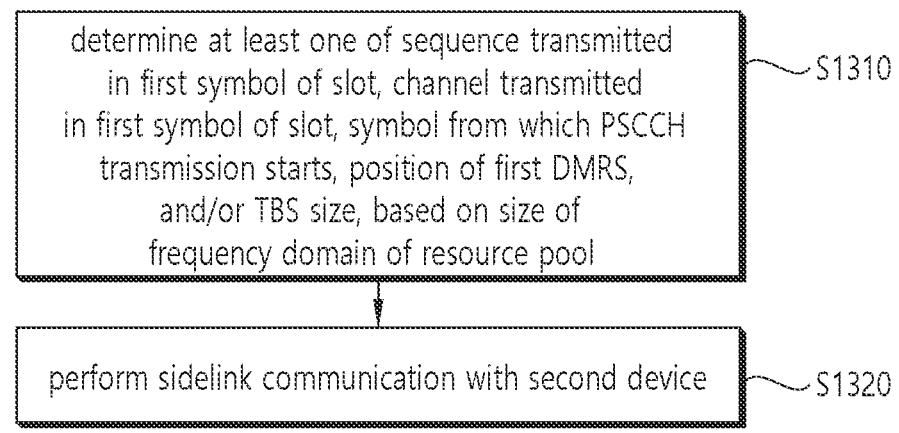
FIG. 13 shows a method for a first device to perform sidelink communication with a second device, based on an embodiment of the present disclosure.

FIG. 13 shows a method for a first device to perform sidelink communication with a second device, based on an embodiment of the present disclosure. The embodiment of FIG. 13 may be combined with various embodiments of the present disclosure.

Referring to FIG. 13, in step S1310, the first device may determine at least one of a sequence transmitted in the first symbol of a slot, a channel transmitted in the first symbol of the slot, a symbol from which PSCCH transmission starts, a position of the first DMRS, and/or a TBS size, based on the modulation scheme and/or the size of the frequency domain of the resource pool. For example, the first device may determine at least one of the sequence transmitted in the first symbol of the slot, the channel transmitted in the first symbol of the slot, the mapping type of the channel transmitted in the first symbol of the slot, the symbol from which PSCCH transmission starts, the position of the first DMRS, and/or the TBS size, based on various embodiments proposed in the present disclosure.

In step S1320, the first device may perform sidelink communication with the second device. For example, the sidelink communication may include: transmitting by the first device at least one of an RS related to AGC, a DMRS, a PSCCH, and/or a PSSCH to the second device.

The proposed method may be applied to the device(s) described below. First, the processor 102 of the first device 100 may determine at least one of the sequence transmitted in the first symbol of the slot, the channel transmitted in the first symbol of the slot, the symbol from which PSCCH transmission starts, the position of the first DMRS, and/or the TBS size, based on the modulation scheme and/or the size of the frequency domain of the resource pool. In addition, the processor 102 of the first device 100 may control the transceiver 106 to perform sidelink communication with the second device 200.

FIG. 14 shows a method for a second device to perform sidelink communication with a first device, based on an embodiment of the present disclosure. The embodiment of FIG. 14 may be combined with various embodiments of the present disclosure.

Referring to FIG. 14, in step S1410, the second device may perform sidelink communication with the first device. For example, the sidelink communication may include: transmitting by the first device at least one of an RS related to AGC, a DMRS, a PSCCH, and/or a PSSCH to the second device.

The proposed method may be applied to the device(s) described below. For example, the processor 202 of the second device 200 may control the transceiver 206 to perform sidelink communication with the first device 100.

Meanwhile, in the present disclosure, for example, a transmitting UE (TX UE) may be a UE which transmits data to a (target) receiving UE (RX UE). For example, the transmitting UE may be a UE which performs PSCCH transmission and/or PSSCH transmission. Additionally/alternatively, the transmitting UE may be a UE which transmits SL CSI-RS(s) and/or a SL CSI report request indicator to the (target) receiving UE. Additionally/alternatively, the transmitting UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) receiving UE. Additionally/alternatively, the transmitting UE may be a UE which transmits a sidelink synchronization signal block (S-SSB) or a sidelink SS/PSBCH block to the (target) receiving UE.

Meanwhile, in the present disclosure, for example, a receiving UE (RX UE) may be a UE which transmits SL HARQ feedback to a transmitting UE (TX UE) based on whether decoding of data received from the transmitting UE is successful and/or whether detection/decoding of a PSCCH (related to PSSCH scheduling) transmitted by the transmitting UE is successful. Additionally/alternatively, the receiving UE may be a UE which performs SL CSI transmission to the transmitting UE based on SL CSI-RS(s) and/or a SL CSI report request indicator received from the transmitting UE. Additionally/alternatively, the receiving UE is a UE which transmits a SL (L1) RSRP measurement value, to the transmitting UE, measured based on (pre-defined) reference signal(s) and/or a SL (L1) RSRP report request indicator received from the transmitting UE. Additionally/alternatively, the receiving UE may be a UE which transmits data of the receiving UE to the transmitting UE.

Additionally/alternatively, the receiving UE may be a UE which performs a SL RLM operation and/or a SL RLF operation based on a (pre-configured) (control) channel and/or reference signal(s) on the (control) channel received from the transmitting UE. Additionally/alternatively, the RX UE may be a UE which receives an S-SSB or a sidelink SS/PSBCH block from the transmitting UE and performs synchronization.

Meanwhile, in the NR V2X communication system, the transmitting UE may transmit an S-SSB or a sidelink SS/PSBCH block to the receiving UE. The receiving UE may perform initial access by using the S-SSB or the sidelink SS/PSBCH block received from the transmitting UE. The S-SSB or the sidelink SS/PSBCH block may include a sidelink primary synchronization signal (S-PSS), a sidelink secondary synchronization signal (S-SSS), and a sidelink physical broadcast channel (PSBCH). The receiving UE may detect an initial signal and obtain synchronization by using the S-PSS received from the transmitting UE. The receiving UE may obtain detailed synchronization by using the S-SSS received from the transmitting UE together with the S-PSS, and may detect a synchronization signal ID. The receiving UE may receive a master information block (MIB) through the PSBCH received from the transmitting UE, and may obtain basic system information included in the MIB. Therefore, the S-PSS, the S-SSS and the PSBCH included in the S-SSB or the sidelink SS/PSBCH block may be very important signals for the receiving UE to obtain synchronization and basic system information, and the receiving UE may have to initially receive and decode the S-SSB for normal data communication.

Meanwhile, in the NR sidelink system, a plurality of numerologies with different subcarrier spacing (SCS) and/or CP lengths may be supported. In this case, as the size of the SCS increases, the length of a time resource for the transmitting UE to transmit the S-SSB may be shortened. Due to this, the coverage of the S-SSB may be reduced. Therefore, in order to ensure the coverage of the S-SSB, the number of S-SSBs transmitted by the transmitting UE to the receiving UE within a specific S-SSB transmission period (e.g., 160 ms) may be configured or pre-configured to one or more for the transmitting UE, based on the size of the SCS. For example, if the size of the SCS is 15 kHz, the transmitting UE may transmit one S-SSB to the receiving UE within one S-SSB transmission period. For example, if the size of the SCS is 30 kHz, the transmitting UE may transmit one or two S-SSBs to the receiving UE within one S-SSB transmission period. In the present disclosure, the S-SSB transmission period may be referred to as an S-SSB period.

Meanwhile, if the size of the SCS is 60 kHz, two types of CPs may be supported, and the structure of the S-SSB transmitted by the transmitting UE to the receiving UE may be different based on the CP type. In this case, the CP type may be normal CP (NCP) or extended CP (ECP). Specifically, for example, if the CP type is the NCP, the number of symbols to which the PSBCH is mapped in the S-SSB transmitted by the transmitting UE may be 9 or 8. On the other hand, for example, if the CP type is the ECP, the number of symbols to which the PSBCH is mapped in the S-SSB transmitted by the transmitting UE may be 7 or 6.

Figure 15:
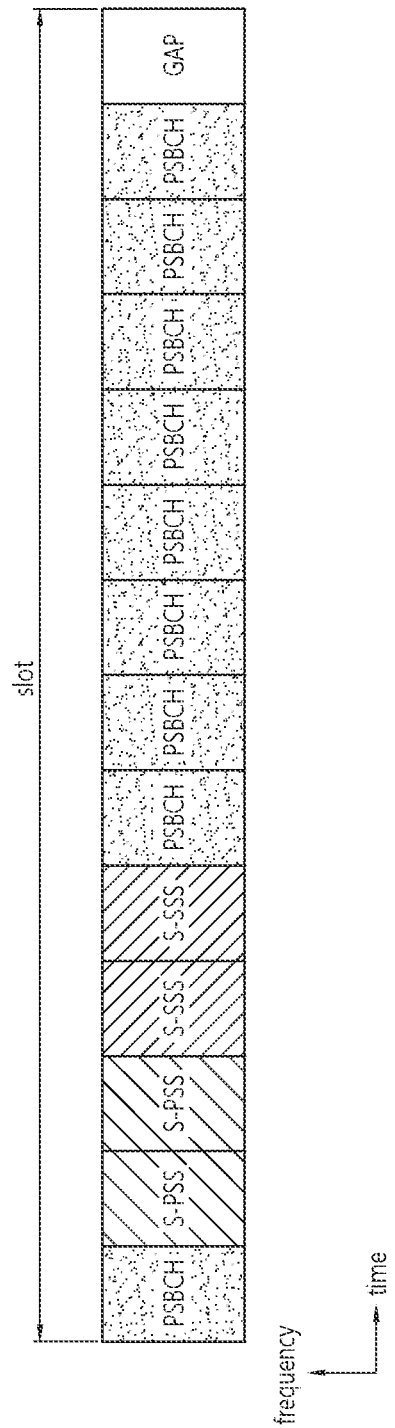
FIG. 15 shows the structure of the S-SSB in the NCP, based on an embodiment of the present disclosure.

FIG. 15 shows the structure of the S-SSB in the NCP, based on an embodiment of the present disclosure. The embodiment of FIG. 15 may be combined with various embodiments of the present disclosure.

For example, if the CP type is the NCP, the order of symbols to which the S-PSS, the S-SSS, and the PSBCH are mapped in the S-SSB transmitted by the transmitting UE may refer to FIG. 15. For example, if the CP type is the ECP, the number of symbols to which the transmitting UE maps the PSBCH after the S-SSS in the S-SSB may be six, unlike FIG. 15. Accordingly, the coverage of the S-SSB may be different depending on whether the CP type is the NCP or the ECP.

In order to ensure the coverage of the above-described S-SSB, the number of S-SSBs transmitted by the transmitting UE to the receiving UE within one S-SSB transmission period or a set for selecting/determining the number of S-SSBs transmitted by the transmitting UE to the receiving UE within one S-SSB transmission period needs to be defined, configured or pre-configured. Based on various embodiments of the present disclosure, a method for defining or (pre-)configuring the number of S-SSBs transmitted within one S-SSB transmission period or a set for selecting/determining the number of S-SSBs transmitted within one S-SSB transmission period for a UE, and an apparatus supporting the same, will be described.

Figure 16:
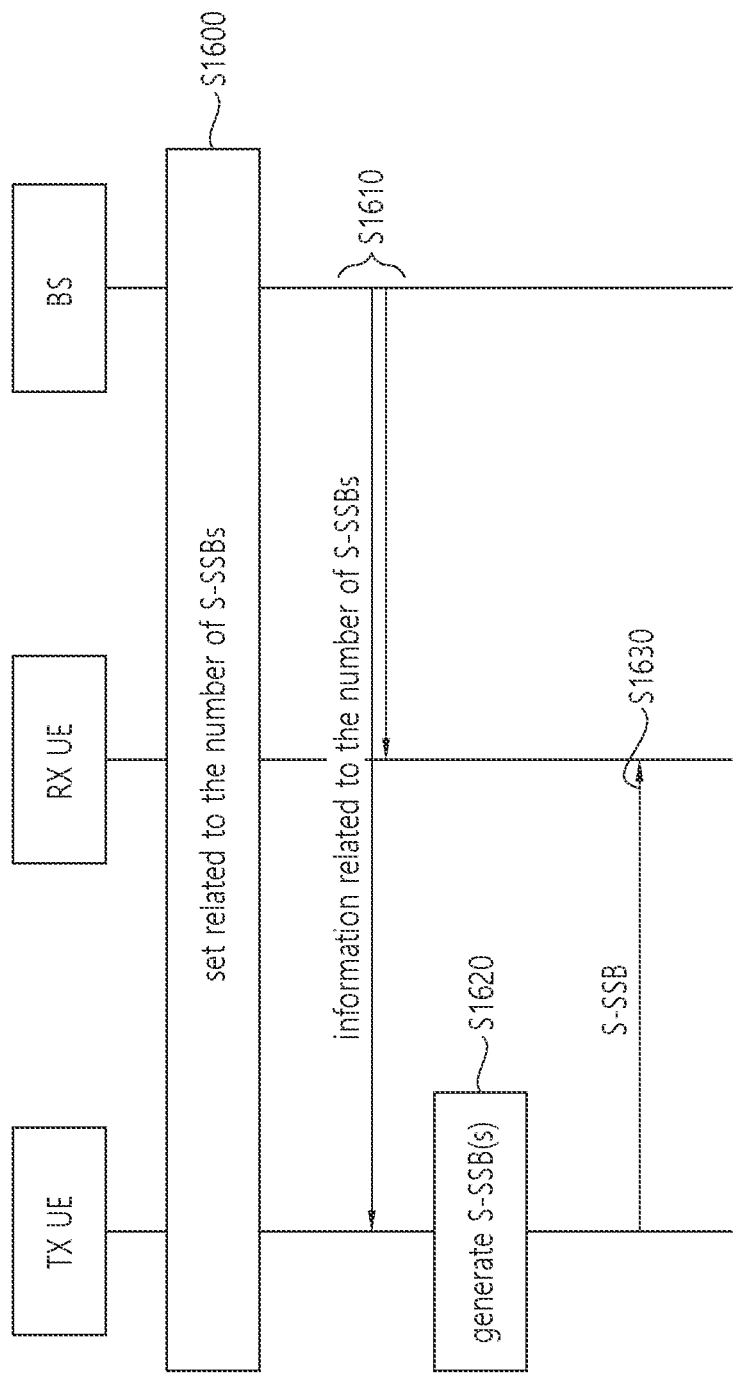
FIG. 16 shows a procedure for a transmitting UE to transmit one or more S-SSBs within an S-SSB period based on information related to the number of S-SSBs, based on an embodiment of the present disclosure.

FIG. 16 shows a procedure for a transmitting UE to transmit one or more S-SSBs within an S-SSB period based on information related to the number of S-SSBs, based on an embodiment of the present disclosure. The embodiment of FIG. 16 may be combined with various embodiments of the present disclosure.

Referring to FIG. 16, in step S1610, a set related to the number of S-SSBs that can be transmitted by the transmitting UE to the receiving UE within one S-SSB transmission period may be configured or defined for a transmitting UE, a receiving UE and/or a base station. For example, if the set related to the number of S-SSBs is {1, 2, 4}, the transmitting UE may transmit one, two, or four S-SSBs to the receiving UE within one S-SSB transmission period. In the present disclosure, the set related to the number of S-SSBs that can be transmitted by the transmitting UE to the receiving UE within one S-SSB transmission period may be referred to as a set for selecting/determining the number of S-SSBs transmitted by the transmitting UE to the receiving UE within one S-SSB transmission period or a set related to the number of S-SSBs.

For example, the set for selecting/determining the number of S-SSBs transmitted by the transmitting UE to the receiving UE within one S-SSB transmission period may be defined. For example, the set for selecting/determining the number of S-SSBs transmitted by the transmitting UE to the receiving UE within one S-SSB transmission period may be configured or pre-configured for the transmitting UE. That is, the transmitting UE may receive information related to the set for selecting/determining the number of S-SSBs transmitted by the transmitting UE to the receiving UE within one S-SSB transmission period, from a network or a base station.

In step S1610, the transmitting UE may receive information related to the number of S-SSBs from the base station. For example, the number of S-SSBs transmitted by the transmitting UE to the receiving UE within one S-SSB transmission period may be defined. For example, the number of S-SSBs transmitted by the transmitting UE to the receiving UE within one S-SSB transmission period may be configured or pre-configured for the transmitting UE. That is, the transmitting UE may receive information related to the number of S-SSBs transmitted by the transmitting UE to the receiving UE within one S-SSB transmission period, from the network or the base station.

Additionally, for example, the receiving UE may receive information related to the number of S-SSBs from the base station. For example, the number of S-SSBs received by the receiving UE from the transmitting UE within one S-SSB transmission period may be defined. For example, the number of S-SSBs received by the receiving UE from the transmitting UE within one S-SSB transmission period may be configured or pre-configured for the receiving UE. That is, the receiving UE may receive information related to the number of S-SSBs received by the receiving UE from the transmitting UE within one S-SSB transmission period, from the network or the base station.

In step S1620, the transmitting UE may generate S-SSB(s). For example, the S-SSB may include the S-PSS, the S-SSS, and the PSBCH.

In step S1630, the transmitting UE may transmit one or more S-SSBs to the receiving UE within one S-SSB transmission period, based on the information related to the number of S-SSBs and/or the information related to the set for selecting/determining the number of S-SSBs. For example, the receiving UE may receive one or more S-SSBs from the transmitting UE within one S-SSB transmission period, based on the information related to the number of S-SSBs and/or the information related to the set for selecting/determining the number of S-SSBs.

For example, if the set related to the number of S-SSBs is {1, 2, 4}, and the information related to the number of S-SSBs represents element 2, the transmitting UE may transmit two S-SSBs to the receiving UE within one S-SSB transmission period. For example, if the set related to the number of S-SSBs is {1, 2, 4}, and the information related to the number of S-SSBs represents element 2, the receiving UE may receive two S-SSBs from the transmitting UE within one S-SSB transmission period.

For example, if the number of S-SSBs transmitted by the transmitting UE to the receiving UE within one S-SSB transmission period is configured or pre-configured for the transmitting UE, the number of S-SSBs may be configured differently or independently for each resource pool or for each carrier. That is, the transmitting UE may receive information related to the number of S-SSBs differently or independently for each resource pool or for each carrier from the network or the base station.

For example, if the set for selecting/determining the number of S-SSBs is configured or pre-configured for the transmitting UE, the set for selecting/determining the number of S-SSBs may be configured differently or independently for each resource pool or for each carrier. That is, the transmitting UE may receive information related to the set for selecting/determining the number of S-SSBs differently or independently for each resource pool or for each carrier from the network or the base station.

For example, the number of S-SSBs transmitted by the transmitting UE to the receiving UE within one S-SSB transmission period may be defined or (pre-)configured differently or independently for the transmitting UE based on the SCS. For example, the set for selecting/determining the number of S-SSBs may be defined or (pre-)configured differently or independently for the transmitting UE based on the SCS. Specifically, for example, as the size of the SCS increases, the number of S-SSBs transmitted by the transmitting UE to the receiving UE within one transmission period may be defined or (pre-)configured for the transmitting UE to be increased.

Figure 17:
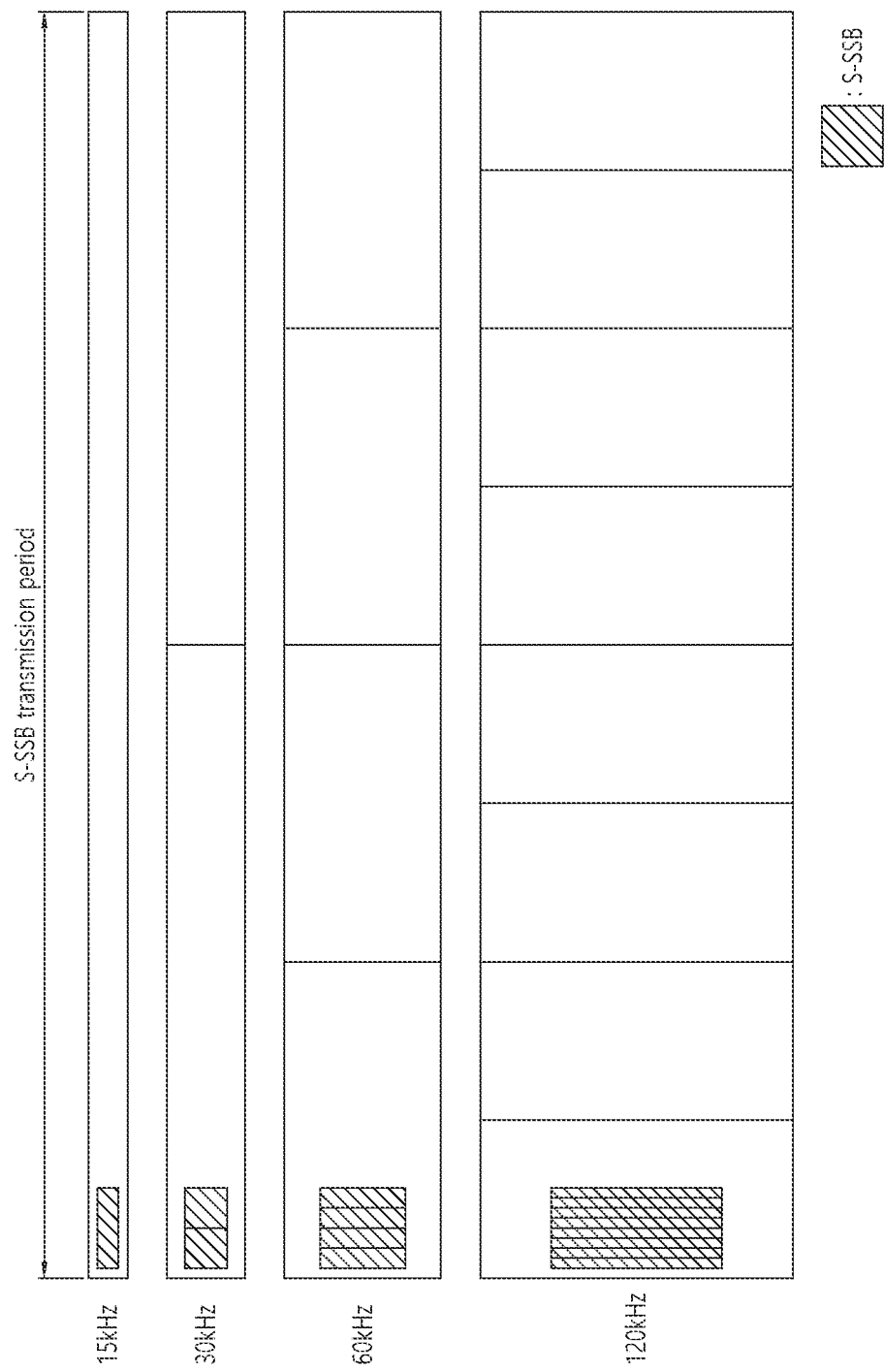
FIG. 17 shows an example in which the number of S-SSBs transmitted by a transmitting UE to a receiving UE within one transmission period increases as the size of the SCS increases, based on an embodiment of the present disclosure.

FIG. 17 shows an example in which the number of S-SSBs transmitted by a transmitting UE to a receiving UE within one transmission period increases as the size of the SCS increases, based on an embodiment of the present disclosure. The embodiment of FIG. 17 may be combined with various embodiments of the present disclosure.

Referring to FIG. 17, for example, in the case of SCS=15 kHz, the transmitting UE may transmit at most one S-SSB within one transmission period. For example, in the case of SCS=30 kHz, the transmitting UE may transmit up to two S-SSBs within one transmission period. For example, in the case of SCS=60 kHz, the transmitting UE may transmit up to four S-SSBs within one transmission period.

Figure 18:
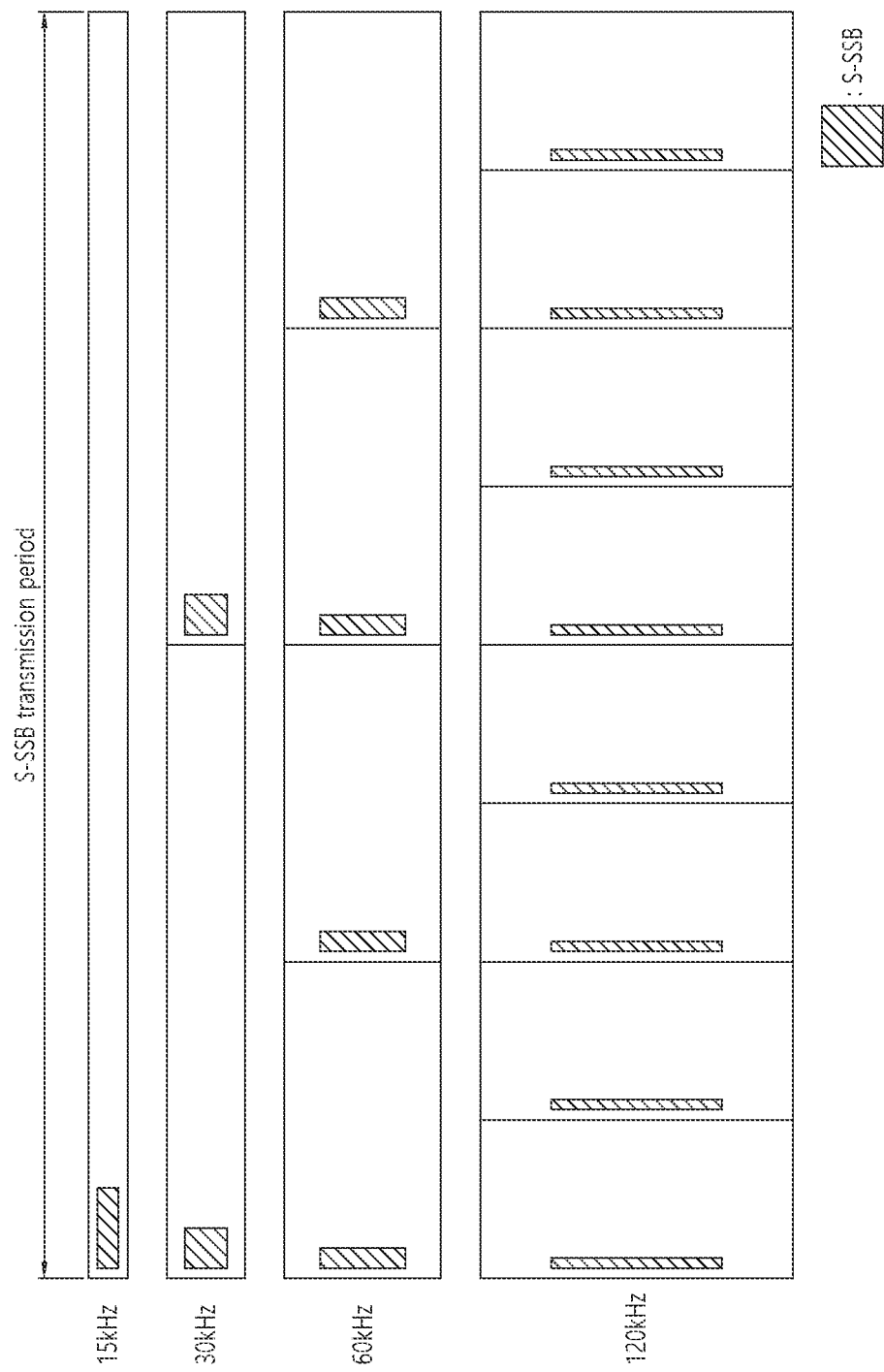
FIG. 18 shows an example in which the number of S-SSBs transmitted by a transmitting UE to a receiving UE within one transmission period increases as the size of the SCS increases, based on an embodiment of the present disclosure.

FIG. 18 shows an example in which the number of S-SSBs transmitted by a transmitting UE to a receiving UE within one transmission period increases as the size of the SCS increases, based on an embodiment of the present disclosure. The embodiment of FIG. 18 may be combined with various embodiments of the present disclosure.

Referring to FIG. 18, for example, in the case of SCS=15 kHz, the transmitting UE may transmit at most one S-SSB within one transmission period. For example, in the case of SCS=30 kHz, the transmitting UE may transmit up to two S-SSBs within one transmission period. For example, in the case of SCS=60 kHz, the transmitting UE may transmit up to four S-SSBs within one transmission period.

For example, if the set for selecting/determining the number of S-SSBs or the number of S-SSBs transmitted by the transmitting UE to the receiving UE within one S-SSB transmission period is (pre-)configured for the transmitting UE, as the size of the SCS increases, the maximum value among candidate values of the number of S-SSBs or the maximum value among elements included in the set for selecting/determining the number of S-SSBs may be (pre-)configured for the transmitting UE to be increased. That is, as the size of the SCS increases, the maximum value among candidate values included in the information related to the number of S-SSBs or the maximum value among elements of a set included in the information related to the set for selecting/determining the number of S-SSBs may be increased. In this case, for example, the size of the SCS may be 15 kHz, 30 kHz, 60 kHz, 120 kHz, etc.

For example, the set for selecting/determining the number of S-SSBs or the number of S-SSBs transmitted by the transmitting UE to the receiving UE within one S-SSB transmission period may be defined or (pre-)configured differently or independently for the transmitting UE based on the CP type. In this case, for example, the CP type may be the NCP or the ECP. Specifically, for example, if the CP type is the ECP, the number of S-SSBs transmitted by the transmitting UE to the receiving UE within the S-SSB transmission period may be defined or (pre-)configured for the transmitting UE to be a value relatively larger than a value when the CP type is the NCP. For example, if the CP type is the ECP, and if the set for selecting/determining the number of S-SSBs or the number of S-SSBs transmitted by the transmitting UE to the receiving UE within one S-SSB transmission period is (pre-)configured for the transmitting UE, the maximum value among candidate values of the number of S-SSBs or the maximum value among elements included in the set for selecting/determining the number of S-SSBs may be (pre-)configured for the transmitting UE to be a value larger than a value when the CP type is the NCP. That is, if the CP type is ECP, the maximum value among candidate values included in the information related to the number of S-SSBs or the maximum value among elements of a set included in the information related to the set for selecting/determining the number of S-SSBs may be a value larger than a value when the CP type is the NCP. Specifically, for example, if the set for selecting/determining the number of S-SSBs or candidate values of the number of S-SSBs (pre-)configured for the transmitting UE is {1, 2, 4} in case the CP type is the NCP, the set for selecting/determining the number of S-SSBs or candidate values of the number of S-SSBs may be (pre-)configured for the transmitting UE to be {1, 2, 3, 5, 6} (or, for example, {1, 2, 5}, {1, 2, 6}, etc. which is a subset of {1, 2, 3, 5, 6}) in case the CP type is the ECP. For example, if the size of the SCS is 60 kHz, the set for selecting/determining the number of S-SSBs or candidate values of the number of S-SSBs transmitted by the transmitting UE within one S-SSB transmission period may be defined or (pre-)configured for the transmitting UE to be the union of candidate values or a set when the CP type is the ECP and candidate values or a set when the CP type is the NCP.

For example, the number of S-SSBs transmitted by the transmitting UE to the receiving UE within one S-SSB transmission period may be defined or (pre-)configured differently or independently for the transmitting UE, based on the speed of the transmitting UE transmitting the S-SSB. For example, the set for selecting/determining the number of S-SSBs may be defined or (pre-)configured differently or independently for the transmitting UE, based on the speed of the transmitting UE transmitting the S-SSB.

For example, the number of S-SSBs transmitted by the transmitting UE to the receiving UE within one S-SSB transmission period may be defined or (pre-)configured differently or independently for the transmitting UE, based on the coverage of the target S-SSB. For example, the set for selecting/determining the number of S-SSBs may be defined or (pre-)configured differently or independently for the transmitting UE, based on the coverage of the target S-SSB.

For example, the number of S-SSBs transmitted by the transmitting UE to the receiving UE within one S-SSB transmission period may be defined or (pre-)configured differently or independently for the transmitting UE, based on a service type. For example, the set for selecting/determining the number of S-SSBs may be defined or (pre-)configured differently or independently for the transmitting UE, based on a service type.

For example, the number of S-SSBs transmitted by the transmitting UE to the receiving UE within one S-SSB transmission period may be defined or (pre-)configured differently or independently for the transmitting UE, based on a carrier frequency. For example, the set for selecting/determining the number of S-SSBs may be defined or (pre-)configured differently or independently for the transmitting UE, based on a carrier frequency.

For example, the number of S-SSBs transmitted by the transmitting UE to the receiving UE within one S-SSB transmission period may be defined or (pre-)configured differently or independently for the transmitting UE, based on the frequency range (FR). For example, the set for selecting/determining the number of S-SSBs may be defined or (pre-)configured differently or independently for the transmitting UE, based on the FR. In this case, for example, the FR may be the FR1 (e.g., 410 MHz to 7125 MHz) or the FR2 (e.g., 24.25 GHz to 52.6 GHz), etc. For example, based on the SCS and the FR, the number of S-SSBs that can be transmitted within one S-SSB period may be configured as shown in Table 7.

TABLE 7

| FR(Frequency Range) | SCS | the number of S-SSBs that can be transmitted |
|---|---|---|
| FR1 | 15 kHz | 1 |
|  | 30 kHz | 1,2 |
|  | 60 kHz | 1, 2, 4 |
| FR2 | 60 kHz | 1, 2, 4, 8, 16, 32 |
|  | 120 kHz | 1, 2, 4, 8, 16, 32, 64 |

Referring to Table 7, for example, in the case of FR=FR1 and SCS=15 kHz, the set related to the number of S-SSBs may be {1}. For example, in the case of FR=FR1 and SCS=30 kHz, the set related to the number of S-SSBs may be {1, 2}. For example, in the case of FR=FR1 and SCS=60 kHz, the set related to the number of S-SSBs may be {1, 2, 4}. For example, in the case of FR=FR2 and SCS=60 kHz, the set related to the number of S-SSBs may be {1, 2, 4, 8, 16, 32}. For example, in the case of FR=FR2 and SCS=120 kHz, the set related to the number of S-SSBs may be {1, 2, 4, 8, 16, 32, 64}.

For example, the number of S-SSBs transmitted by the transmitting UE to the receiving UE within one S-SSB transmission period may be defined or (pre-)configured differently or independently for the transmitting UE, based on a priority of a carrier for transmitting the S-SSB. For example, the set for selecting/determining the number of S-SSBs may be defined or (pre-)configured differently or independently for the transmitting UE, based on a priority of a carrier for transmitting the S-SSB.

For example, the number of S-SSBs transmitted by the transmitting UE to the receiving UE within one S-SSB transmission period may be defined or (pre-)configured differently or independently for the transmitting UE, based on a priority of a target service provided on a carrier for transmitting the S-SSB. For example, the set for selecting/determining the number of S-SSBs may be defined or (pre-)configured differently or independently for the transmitting UE, based on a priority of a target service provided on a carrier for transmitting the S-SSB.

For example, the number of S-SSBs transmitted by the transmitting UE to the receiving UE within one S-SSB transmission period may be defined or (pre-)configured differently or independently for the transmitting UE, based on the type of the UE. For example, the set for selecting/determining the number of S-SSBs may be defined or (pre-)configured differently or independently for the transmitting UE, based on the type of the UE.

For example, the number of S-SSBs transmitted by the transmitting UE to the receiving UE within one S-SSB transmission period may be defined or (pre-)configured differently or independently for the transmitting UE, based on the type of the transmitting UE transmitting the S-SSB. For example, the set for selecting/determining the number of S-SSBs may be defined or (pre-)configured differently or independently for the transmitting UE, based on the type of the transmitting UE transmitting the S-SSB.

For example, the number of S-SSBs transmitted by the transmitting UE to the receiving UE within one S-SSB transmission period may be defined or (pre-)configured differently or independently for the transmitting UE, based on a synchronization reference or a synchronization source. For example, the set for selecting/determining the number of S-SSBs may be defined or (pre-)configured differently or independently for the transmitting UE, based on a synchronization reference or a synchronization source. In this case, for example, the synchronization reference or the synchronization source may be a GNSS, a gNB/eNB or other UE (e.g., a UE synchronized directly with the GNSS, a UE synchronized with multi-hop from the GNSS (or indirectly with the GNSS), a UE synchronized directly with the gNB/eNB, a UE synchronized with multi-hop from the gNB/eNB (or indirectly with the gNB/eNB)).

For example, the number of S-SSBs transmitted by the transmitting UE to the receiving UE within one S-SSB transmission period may be defined or (pre-)configured differently or independently for the transmitting UE, based on a carrier type for transmitting the S-SSB. For example, the set for selecting/determining the number of S-SSBs may be defined or (pre-)configured differently or independently for the transmitting UE, based on a carrier type for transmitting the S-SSB. In this case, the carrier type may be a licensed carrier, an Intelligent Transport Systems (ITS) dedicated carrier (ITS-dedicated carrier), etc. For example, since interference occurs significantly in a licensed band carrier compared to an ITS-dedicated carrier, a larger number of S-SSB transmissions may be required within the S-SSB transmission period in order to secure the same coverage as the ITS dedicated carrier. Specifically, for example, in the case of the licensed band carrier, the number of S-SSBs transmitted by the transmitting UE to the receiving UE within one S-SSB transmission period may be defined or (pre-)configured for the transmitting UE to be a value relatively larger than a value of the ITS-dedicated carrier. For example, if the set for selecting/determining the number of S-SSBs or the number of S-SSBs transmitted by the transmitting UE to the receiving UE within one S-SSB transmission period is (pre-)configured for the transmitting UE in the licensed band carrier, the maximum value among candidate values of the number of S-SSBs or the maximum value among elements included in the set for selecting/determining the number of S-SSBs may be (pre-)configured for the transmitting UE to be a value larger than a value of the ITS-dedicated carrier. That is, the maximum value among candidate values included in the information related to the number of S-SSBs or the maximum value among elements of a set included in the information related to the set for selecting/determining the number of S-SSBs may be a value larger than a value of the ITS-dedicated carrier.

Based on various embodiments of the present disclosure, the set related to the number of S-SSBs may be configured for the UE, and the UE may transmit as many S-SSB as a value indicated/informed by the base station/network among one or more elements included in the set within one S-SSB period. Accordingly, the UE can efficiently transmit N (e.g., positive integer) S-SSBs within one S-SSB period.

FIG. 19 shows a method for a first device to transmit an S-SSB, based on an embodiment of the present disclosure. The embodiment of FIG. 19 may be combined with various embodiments of the present disclosure.

Referring to FIG. 19, in step S1910, the first device may transmit S-SSB(s) to the second device based on information related to the number of S-SSBs or information related to the set for selecting/determining the number of S-SSBs. For example, the first device may receive information related to the number of S-SSBs or information related to the set for selecting/determining the number of S-SSBs from the base station/network. For example, the base station may configure or pre-configure information related to the number of S-SSBs or information related to the set for selecting/determining the number of S-SSBs to the first device. For example, information related to the number of S-SSBs or information related to the set for selecting/determining the number of S-SSBs may be predefined for the first device.

For example, the number of S-SSBs or the set for selecting/determining the number of S-SSBs may be defined, configured or pre-configured differently or independently for each resource pool or for each carrier. For example, the number of S-SSBs or the set for selecting/determining the number of S-SSBs may be defined, configured or pre-configured differently or independently based on the SCS. For example, the number of S-SSBs or the set for selecting/determining the number of S-SSBs may be defined, configured or pre-configured differently or independently based on the CP type. For example, the number of S-SSBs or the set for selecting/determining the number of S-SSBs may be defined, configured or pre-configured differently or independently based on the speed of the first device. For example, the number of S-SSBs or the set for selecting/determining the number of S-SSBs may be defined, configured or pre-configured differently or independently based on the coverage of the target S-SSB. For example, the number of S-SSBs or the set for selecting/determining the number of S-SSBs may be defined, configured or pre-configured differently or independently based on the type of the service.

For example, the number of S-SSBs or the set for selecting/determining the number of S-SSBs may be defined, configured or pre-configured differently or independently based on the frequency range in which the S-SSB(s) is transmitted. For example, the number of S-SSBs or the set for selecting/determining the number of S-SSBs may be defined, configured or pre-configured differently or independently based on the priority of the carrier through which the S-SSB(s) is transmitted. For example, the number of S-SSBs or the set for selecting/determining the number of S-SSBs may be defined, configured or pre-configured differently or independently based on the type of the device. For example, the number of S-SSBs or the set for selecting/determining the number of S-SSBs may be defined, configured or pre-configured differently or independently based on the type of the first device transmitting the S-SSB(s). For example, the number of S-SSBs or the set for selecting/determining the number of S-SSBs may be defined, configured or pre-configured differently or independently based on the synchronization reference or the synchronization source. For example, the number of S-SSBs or the set for selecting/determining the number of S-SSBs may be defined, configured or pre-configured differently or independently based on the carrier type for transmitting the S-SSB(s).

For example, the first device may select/determine the number of S-SSBs from the set for selecting/determining the number of S-SSBs based on various embodiments proposed in the present disclosure. In addition, the first device may transmit one or more S-SSBs to the second device within the S-SSB transmission period.

Figure 20:
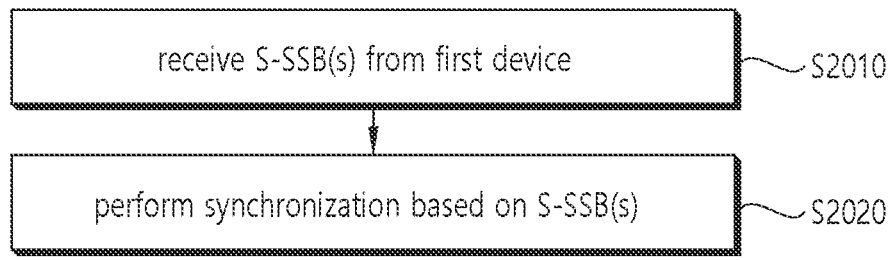
FIG. 20 shows a method for a second device to receive an S-SSB, based on an embodiment of the present disclosure.

FIG. 20 shows a method for a second device to receive an S-SSB, based on an embodiment of the present disclosure. The embodiment of FIG. 20 may be combined with various embodiments of the present disclosure.

Referring to FIG. 20, in step S2010, the second device may receive S-SSB(s) from the first device. In step S2020, the second device may perform synchronization based on the S-SSB(s).

For example, the S-SSB(s) may be transmitted by the first device based on information related to the number of S-SSBs or information related to the set for selecting/determining the number of S-SSBs. For example, the first device may receive information related to the number of S-SSBs or information related to the set for selecting/determining the number of S-SSBs from the base station/network. For example, the base station may configure or pre-configure information related to the number of S-SSBs or information related to the set for selecting/determining the number of S-SSBs to the first device. For example, information related to the number of S-SSBs or information related to the set for selecting/determining the number of S-SSBs may be predefined for the first device. For example, the number of S-SSBs or the set for selecting/determining the number of S-SSBs may be defined, configured or pre-configured differently or independently for each resource pool or for each carrier. For example, the number of S-SSBs or the set for selecting/determining the number of S-SSBs may be defined, configured or pre-configured differently or independently based on the SCS. For example, the number of S-SSBs or the set for selecting/determining the number of S-SSBs may be defined, configured or pre-configured differently or independently based on the CP type. For example, the number of S-SSBs or the set for selecting/determining the number of S-SSBs may be defined, configured or pre-configured differently or independently based on the speed of the first device. For example, the number of S-SSBs or the set for selecting/determining the number of S-SSBs may be defined, configured or pre-configured differently or independently based on the coverage of the target S-SSB. For example, the number of S-SSBs or the set for selecting/determining the number of S-SSBs may be defined, configured or pre-configured differently or independently based on the type of the service.

For example, the number of S-SSBs or the set for selecting/determining the number of S-SSBs may be defined, configured or pre-configured differently or independently based on the frequency range in which the S-SSB(s) is transmitted. For example, the number of S-SSBs or the set for selecting/determining the number of S-SSBs may be defined, configured or pre-configured differently or independently based on the priority of the carrier through which the S-SSB(s) is transmitted. For example, the number of S-SSBs or the set for selecting/determining the number of S-SSBs may be defined, configured or pre-configured differently or independently based on the type of the device. For example, the number of S-SSBs or the set for selecting/determining the number of S-SSBs may be defined, configured or pre-configured differently or independently based on the type of the first device transmitting the S-SSB(s). For example, the number of S-SSBs or the set for selecting/determining the number of S-SSBs may be defined, configured or pre-configured differently or independently based on the synchronization reference or the synchronization source. For example, the number of S-SSBs or the set for selecting/determining the number of S-SSBs may be defined, configured or pre-configured differently or independently based on the carrier type for transmitting the S-SSB(s).

Figure 21:
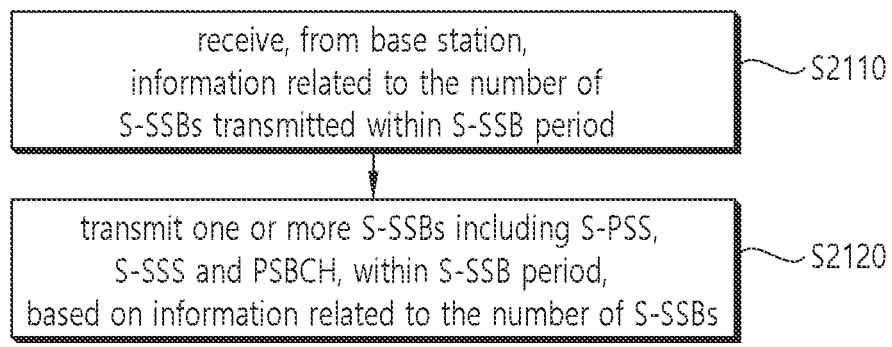
FIG. 21 shows a method for a first device to perform wireless communication, based on an embodiment of the present disclosure.

FIG. 21 shows a method for a first device to perform wireless communication, based on an embodiment of the present disclosure. The embodiment of FIG. 21 may be combined with various embodiments of the present disclosure.

Referring to FIG. 21, in step S2110, the first device may receive, from a base station, information related to a number of sidelink synchronization signal blocks (S-SSBs) transmitted within a S-SSB period. In step S2120, the first device may transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs. For example, the number of S-SSBs may be selected from one or more elements included in a set of a number of S-SSBs allowed to transmit within the S-SSB period. For example, the set of the number of S-SSBs allowed to transmit within the S-SSB period may be configured differently based on a sub-carrier spacing (SCS) and a frequency range (FR).

For example, the FR may include a first FR and a second FR, and the first FR may be a frequency range lower than the second FR. For example, a maximum value of elements included in a set of a number of S-SSBs allowed to transmit which is related to the first FR may be less than a maximum value of elements included in a set of a number of S-SSBs allowed to transmit which is related to the second FR. For example, the first FR may be a frequency range between 410 MHz and 7125 MHz, and the second FR may be a frequency range between 24.25 GHz and 52.6 GHz.

For example, the set of the number of S-SSBs allowed to transmit within the S-SSB period may be configured differently based on a type of a cyclic prefix (CP). For example, the CP may be a normal CP or an extended CP.

For example, the set of the number of S-SSBs allowed to transmit within the S-SSB period may be configured differently based on speed of the first device. For example, the set of the number of S-SSBs allowed to transmit within the S-SSB period may be configured differently based on a type of a service transmitted by the first device. For example, the set of the number of S-SSBs allowed to transmit within the S-SSB period may be configured differently based on a priority of a carrier through which the one or more S-SSBs are transmitted. For example, the set of the number of S-SSBs allowed to transmit within the S-SSB period may be configured differently based on a type of the first device. For example, the set of the number of S-SSBs allowed to transmit within the S-SSB period may be configured differently based on a synchronization reference related to the first device.

For example, the set of the number of S-SSBs allowed to transmit within the S-SSB period may be configured differently based on a type of a carrier through which the one or more S-SSBs are transmitted. For example, the type of the carrier may be a licensed carrier or an intelligent transport systems (ITS)-dedicated carrier.

The proposed method can be applied to the device(s) described below. First, the processor 102 of the first device 100 may control the transceiver 106 to receive, from a base station, information related to a number of sidelink synchronization signal blocks (S-SSBs) transmitted within a S-SSB period. In addition, the processor 102 of the first device 100 may control the transceiver 106 to transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs. For example, the number of S-SSBs may be selected from one or more elements included in a set of a number of S-SSBs allowed to transmit within the S-SSB period. For example, the set of the number of S-SSBs allowed to transmit within the S-SSB period may be configured differently based on a sub-carrier spacing (SCS) and a frequency range (FR).

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a number of sidelink synchronization signal blocks (S-SSBs) transmitted within a S-SSB period; and transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a number of sidelink synchronization signal blocks (S-SSBs) transmitted within a S-SSB period; and transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Based on an embodiment of the present disclosure, anon-transitory computer-readable storage medium storing instructions may be provided. For example, the instructions, when executed, may cause a first device to: receive, from a base station, information related to a number of sidelink synchronization signal blocks (S-SSBs) transmitted within a S-SSB period; and transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Figure 22:
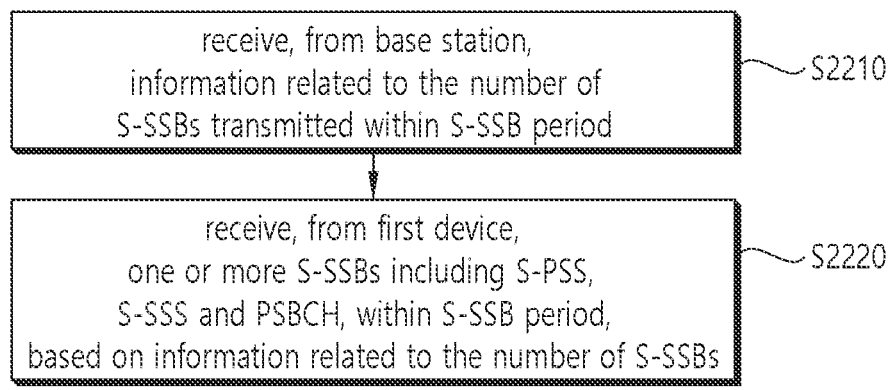
FIG. 22 shows a method for a second device to perform wireless communication, based on an embodiment of the present disclosure.

FIG. 22 shows a method for a second device to perform wireless communication, based on an embodiment of the present disclosure. The embodiment of FIG. 22 may be combined with various embodiments of the present disclosure.

Referring to FIG. 22, in step S2210, the second device may receive, from a base station, information related to a number of sidelink synchronization signal blocks (S-SSBs) transmitted within a S-SSB period. In step S2220, the second device may receive, from a first device, one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs. For example, the number of S-SSBs may be selected from one or more elements included in a set of a number of S-SSBs allowed to transmit within the S-SSB period. For example, the set of the number of S-SSBs allowed to transmit within the S-SSB period may be configured differently based on a sub-carrier spacing (SCS) and a frequency range (FR).

The proposed method can be applied to the device(s) described below. First, the processor 202 of the second device 200 may control the transceiver 206 to receive, from a base station, information related to a number of sidelink synchronization signal blocks (S-SSBs) transmitted within a S-SSB period. In addition, the processor 202 of the second device 200 may control the transceiver 206 to receive, from a first device, one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs. For example, the number of S-SSBs may be selected from one or more elements included in a set of a number of S-SSBs allowed to transmit within the S-SSB period. For example, the set of the number of S-SSBs allowed to transmit within the S-SSB period may be configured differently based on a sub-carrier spacing (SCS) and a frequency range (FR).

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a base station, information related to a number of sidelink synchronization signal blocks (S-SSBs) transmitted within a S-SSB period; and receive, from a first device, one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a number of sidelink synchronization signal blocks (S-SSBs) transmitted within a S-SSB period; and receive, from a first UE, one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Based on an embodiment of the present disclosure, anon-transitory computer-readable storage medium storing instructions may be provided. For example, the instructions, when executed, may cause a second device to: receive, from a base station, information related to a number of sidelink synchronization signal blocks (S-SSBs) transmitted within a S-SSB period; and receive, from a first device, one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
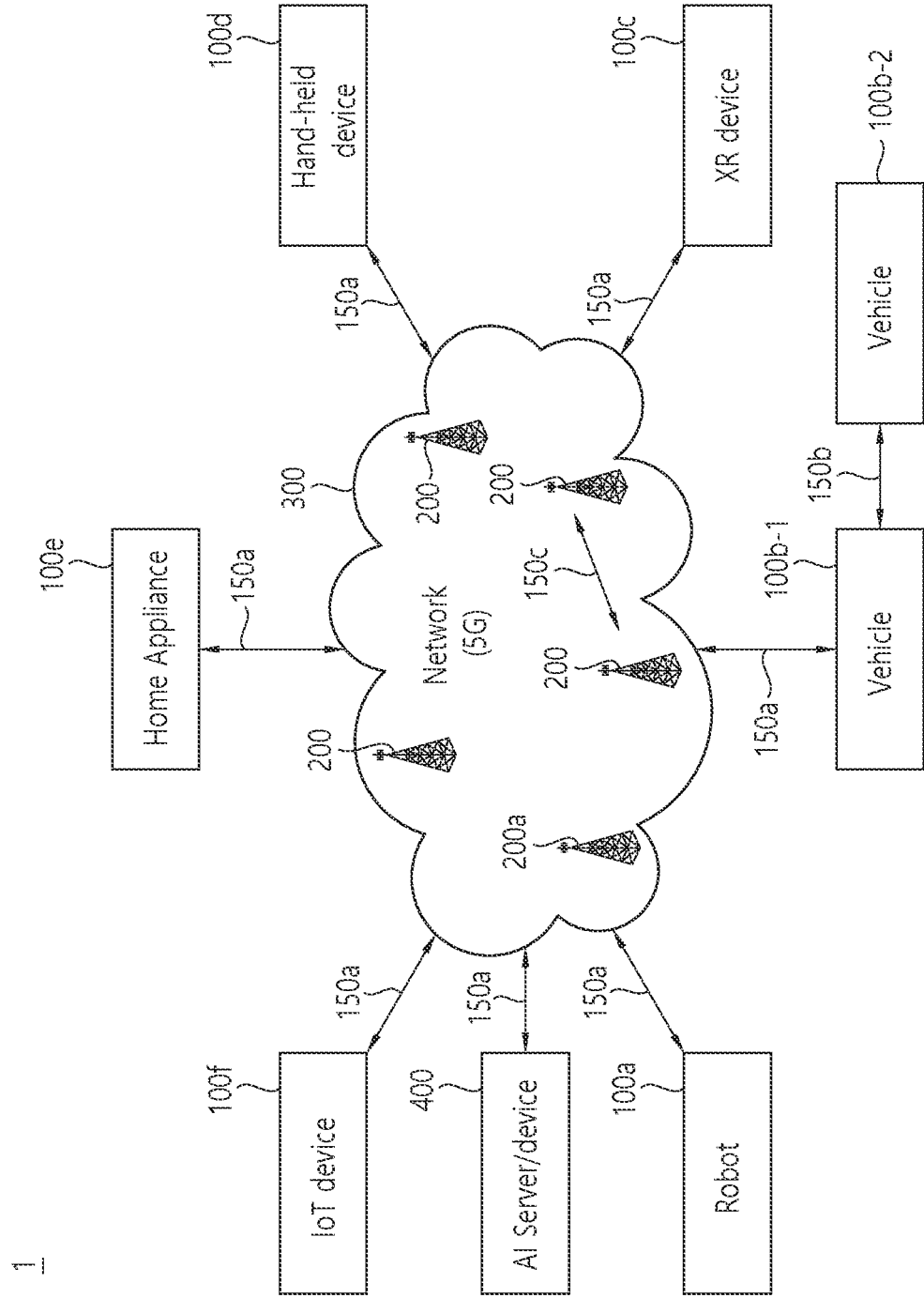
FIG. 23 shows a communication system 1, based on an embodiment of the present disclosure.

FIG. 23 shows a communication system 1, based on an embodiment of the present disclosure.

Referring to FIG. 23, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
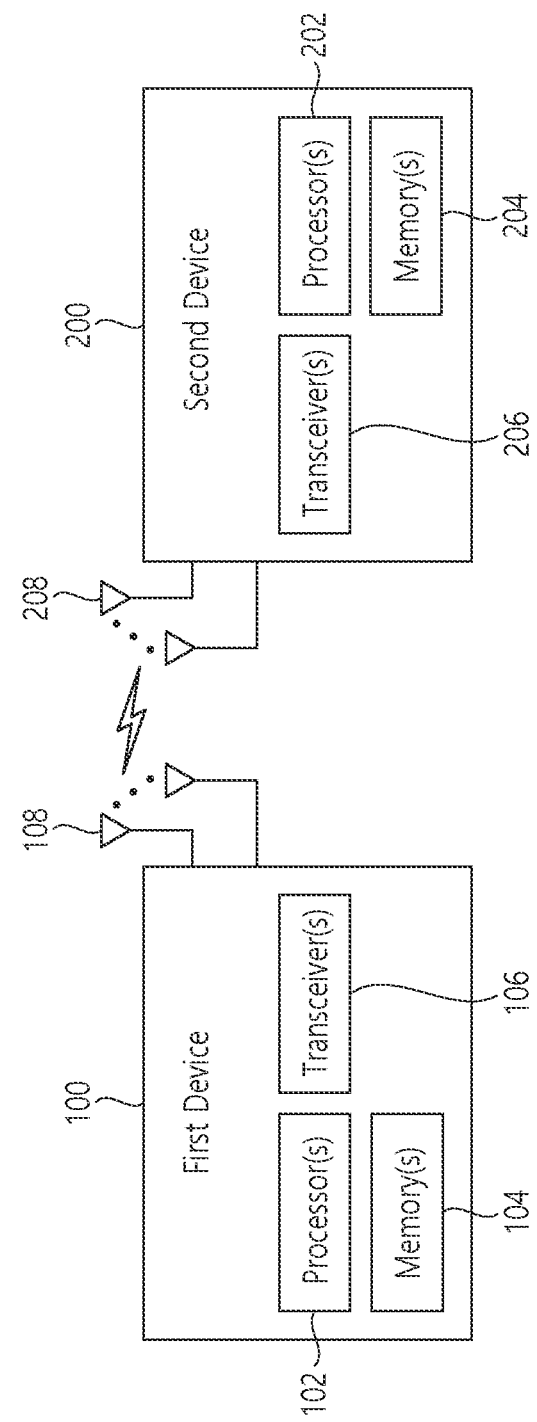
FIG. 24 shows wireless devices, based on an embodiment of the present disclosure.

FIG. 24 shows wireless devices, based on an embodiment of the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
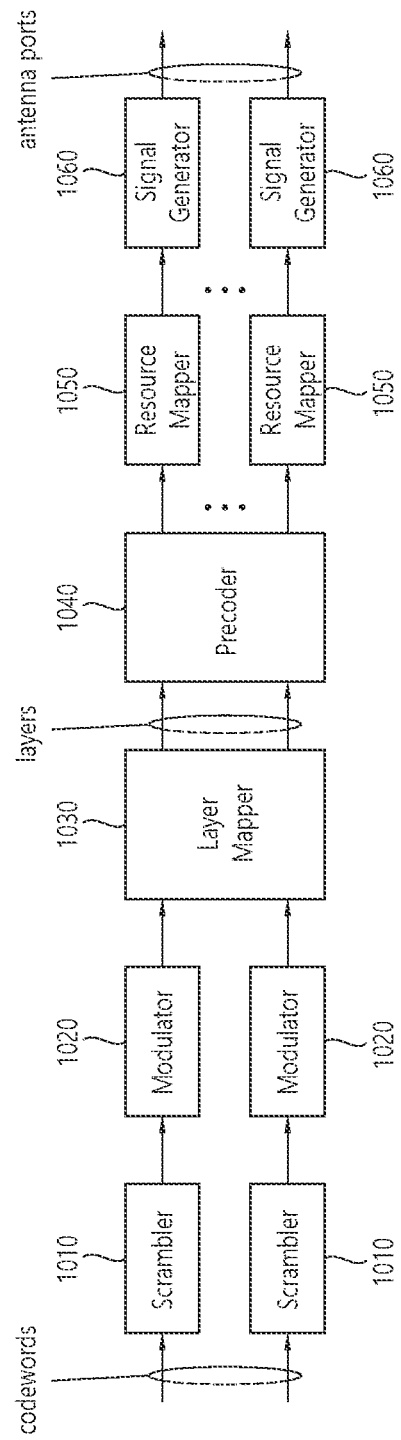
FIG. 25 shows a signal process circuit for a transmission signal, based on an embodiment of the present disclosure.

FIG. 25 shows a signal process circuit for a transmission signal, based on an embodiment of the present disclosure.

Referring to FIG. 25, a signal processing circuit 1000 may include scramblers 1010, modulators 1020, a layer mapper 1030, a precoder 1040, resource mappers 1050, and signal generators 1060. An operation/function of FIG. 25 may be performed, without being limited to, the processors 102 and 202 and/or the transceivers 106 and 206 of FIG. 24. Hardware elements of FIG. 25 may be implemented by the processors 102 and 202 and/or the transceivers 106 and 206 of FIG. 24. For example, blocks 1010 to 1060 may be implemented by the processors 102 and 202 of FIG. 24. Alternatively, the blocks 1010 to 1050 may be implemented by the processors 102 and 202 of FIG. 24 and the block 1060 may be implemented by the transceivers 106 and 206 of FIG. 24.

Codewords may be converted into radio signals via the signal processing circuit 1000 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
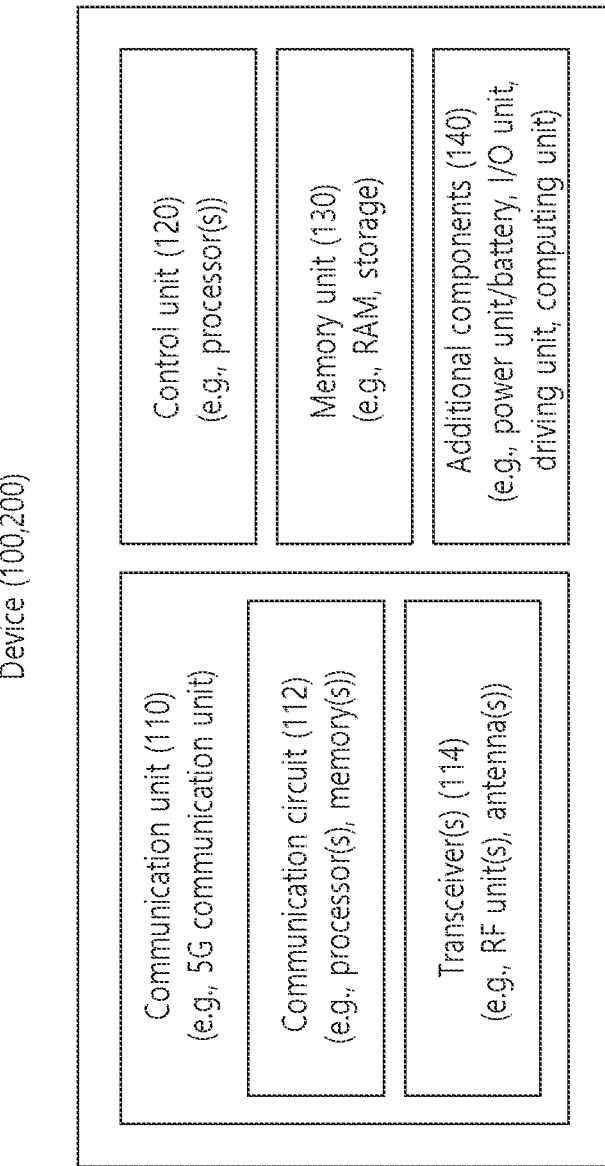
FIG. 26 shows another example of a wireless device, based on an embodiment of the present disclosure.

FIG. 26 shows another example of a wireless device, based on an embodiment of the present disclosure. The wireless device may be implemented in various forms according to a use-case/service (refer to FIG. 23).

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/ device (400 of FIG. 23), the BSs (200 of FIG. 23), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
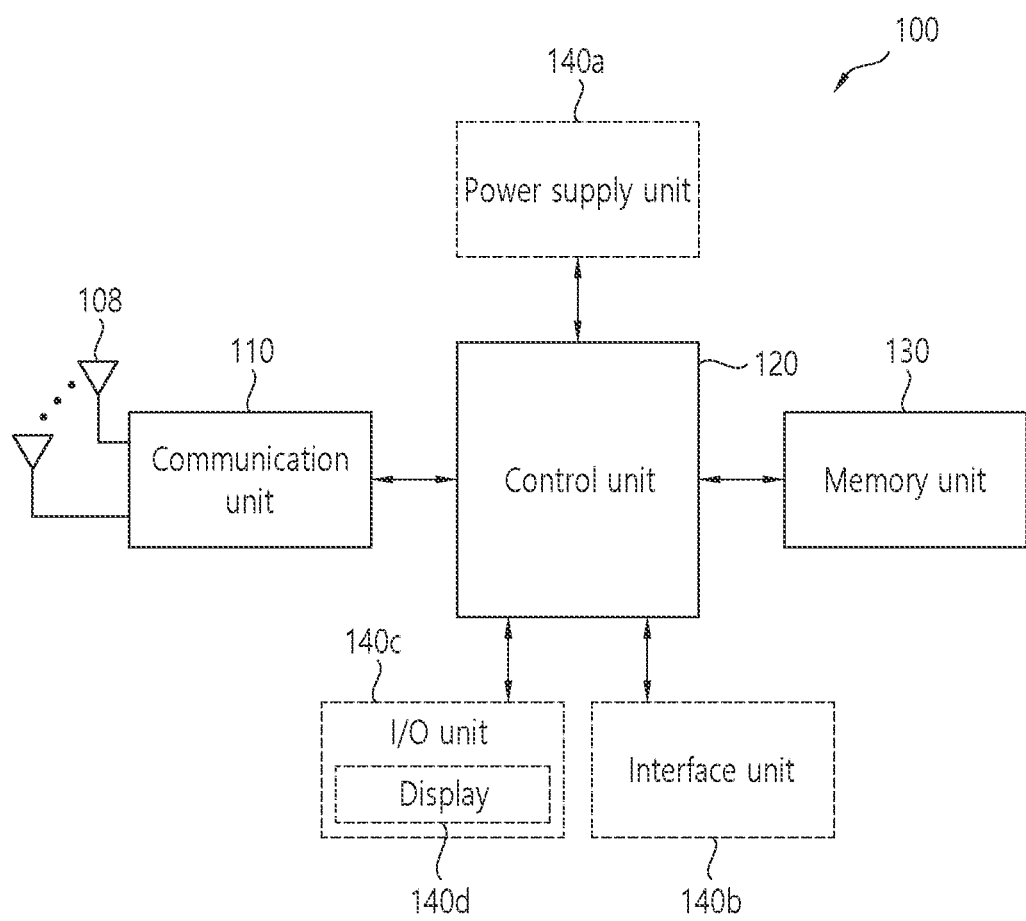
FIG. 27 shows a hand-held device, based on an embodiment of the present disclosure.

FIG. 27 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
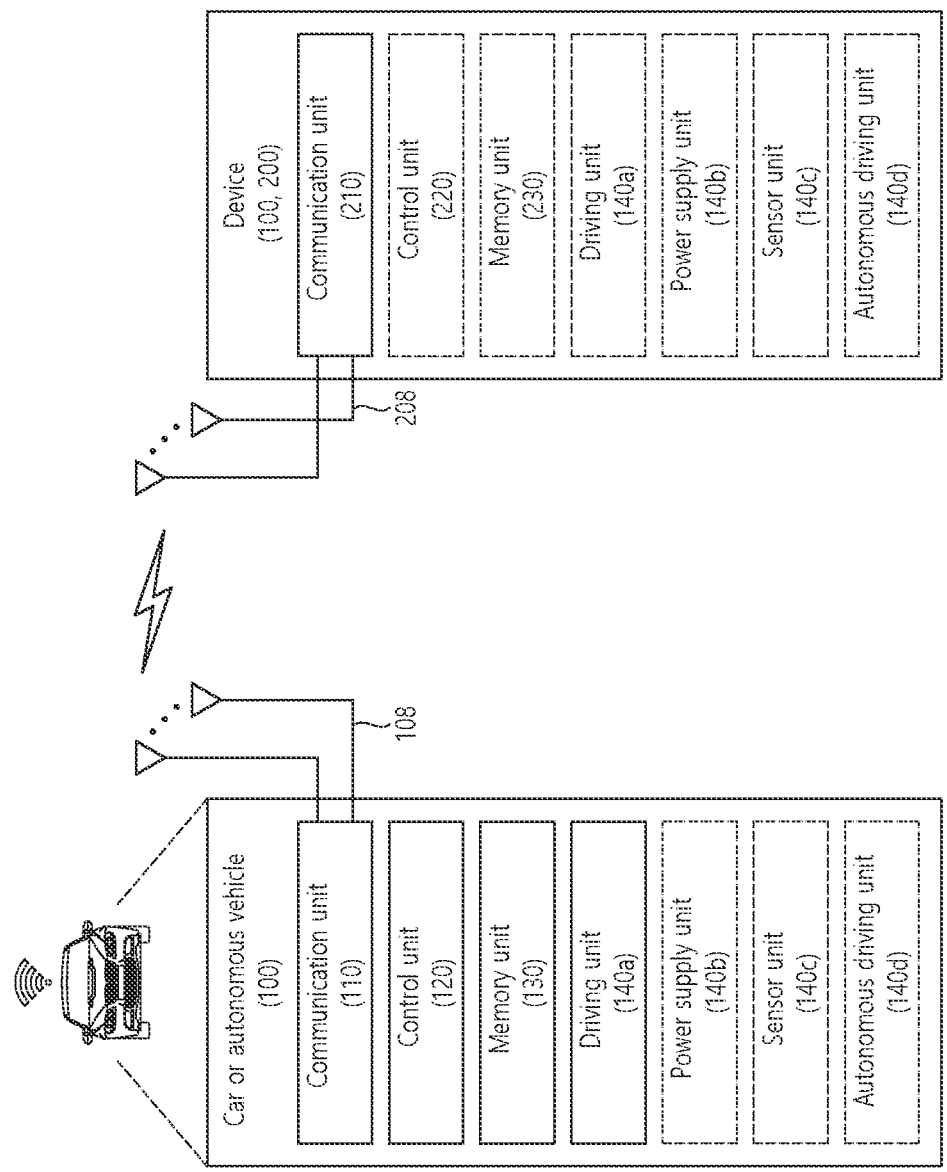
FIG. 28 shows a vehicle or an autonomous vehicle, based on an embodiment of the present disclosure.

FIG. 28 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    receiving, from a base station, information related to a number of sidelink synchronization signal blocks (S-SSBs) transmitted within a S-SSB period; and
    transmitting one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs,
    wherein the number of S-SSBs is selected from one or more elements included in a set of a number of S-SSBs allowed to transmit within the S-SSB period, and
    wherein the set of the number of S-SSBs allowed to transmit within the S-SSB period is configured differently based on a sub-carrier spacing (SCS) and a frequency range (FR).

2. The method of claim 1, wherein the FR includes a first FR and a second FR, and
    wherein the first FR is a frequency range lower than the second FR.

3. The method of claim 2, wherein a maximum value of elements included in a set of a number of S-SSBs allowed to transmit which is related to the first FR is less than a maximum value of elements included in a set of a number of S-SSBs allowed to transmit which is related to the second FR.

4. The method of claim 2, wherein the first FR is a frequency range between 410 MHz and 7125 MHz, and
    wherein the second FR is a frequency range between 24.25 GHz and 52.6 GHz.

5. The method of claim 1, wherein the set of the number of S-SSBs allowed to transmit within the S-SSB period is configured differently based on a type of a cyclic prefix (CP).

6. The method of claim 5, wherein the CP is a normal CP or an extended CP.

7. The method of claim 1, wherein the set of the number of S-SSBs allowed to transmit within the S-SSB period is configured differently based on speed of the first device.

8. The method of claim 1, wherein the set of the number of S-SSBs allowed to transmit within the S-SSB period is configured differently based on a type of a service transmitted by the first device.

9. The method of claim 1, wherein the set of the number of S-SSBs allowed to transmit within the S-SSB period is configured differently based on a priority of a carrier through which the one or more S-SSBs are transmitted.

10. The method of claim 1, wherein the set of the number of S-SSBs allowed to transmit within the S-SSB period is configured differently based on a type of the first device.

11. The method of claim 1, wherein the set of the number of S-SSBs allowed to transmit within the S-SSB period is configured differently based on a synchronization reference related to the first device.

12. The method of claim 1, wherein the set of the number of S-SSBs allowed to transmit within the S-SSB period is configured differently based on a type of a carrier through which the one or more S-SSBs are transmitted.

13. The method of claim 12, wherein the type of the carrier is a licensed carrier or an intelligent transport systems (ITS)-dedicated carrier.

14. A first device configured to perform wireless communication, the first device comprising:
    one or more memories storing instructions;
    one or more transceivers; and
    one or more processors connected to the one or more memories and the one or more transceivers, wherein the one or more processors execute the instructions to:
    receive, from a base station, information related to a number of sidelink synchronization signal blocks (S-SSBs) transmitted within a S-SSB period; and
    transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs,
    wherein the number of S-SSBs is selected from one or more elements included in a set of a number of S-SSBs allowed to transmit within the S-SSB period, and
    wherein the set of the number of S-SSBs allowed to transmit within the S-SSB period is configured differently based on a sub-carrier spacing (SCS) and a frequency range (FR).

15. The first device of claim 14 wherein the FR includes a first FR and a second FR, and
    wherein the first FR is a frequency range lower than the second FR.

16. The first device of claim 15, wherein a maximum value of elements included in a set of a number of S-SSBs allowed to transmit which is related to the first FR is less than a maximum value of elements included in a set of a number of S-SSBs allowed to transmit which is related to the second FR.

17. The first device of claim 15, wherein the first FR is a frequency range between 410 MHz and 7125 MHz, and
    wherein the second FR is a frequency range between 24.25 GHz and 52.6 GHz.

18. The first device of claim 14, wherein the set of the number of S-SSBs allowed to transmit within the S-SSB period is configured differently based on a type of a cyclic prefix (CP).

19. The first device of claim 18, wherein the CP is a normal CP or an extended CP.

20. An apparatus configured to control a first user equipment (UE) performing wireless communication, the apparatus comprising:
    one or more processors; and
    one or more memories operably connected to the one or more processors and storing instructions, wherein the one or more processors execute the instructions to:

receive, from a base station, information related to a number of sidelink synchronization signal blocks (S-SSBs) transmitted within a S-SSB period; and transmit one or more S-SSBs including a sidelink primary synchronization signal (S-PSS), a sidelink secondary synchronization signal (S-SSS) and a physical sidelink broadcast channel (PSBCH), within the S-SSB period, based on the information related to the number of S-SSBs, wherein the number of S-SSBs is selected from one or more elements included in a set of a number of S-SSBs allowed to transmit within the S-SSB period, and wherein the set of the number of S-SSBs allowed to transmit within the S-SSB period is configured differently based on a sub-carrier spacing (SCS) and a frequency range (FR).

* * * * *